US012188836B1

(12) United States Patent
Moerschell

(10) Patent No.: US 12,188,836 B1
(45) Date of Patent: Jan. 7, 2025

(54) DIFFERENTIAL PRESSURE DETECTOR AND METHOD FOR SENSING BODY FALL INTO POOL

(71) Applicant: Richard Moerschell, Burke, VA (US)

(72) Inventor: Richard Moerschell, Burke, VA (US)

( * ) Notice: Subject to any disclaimer, the term of this patent is extended or adjusted under 35 U.S.C. 154(b) by 0 days.

(21) Appl. No.: 18/792,432

(22) Filed: Aug. 1, 2024

(51) Int. Cl.
| | |
|---|---|
| *G01L 13/00* | (2006.01) |
| *G01L 19/08* | (2006.01) |
| *G01L 19/12* | (2006.01) |
| *G01L 27/00* | (2006.01) |
| *G08B 21/08* | (2006.01) |

(52) U.S. Cl.
CPC ............ *G01L 13/00* (2013.01); *G01L 19/086* (2013.01); *G01L 19/12* (2013.01); *G01L 27/002* (2013.01); *G08B 21/082* (2013.01); *G08B 21/086* (2013.01)

(58) Field of Classification Search
CPC .. G08B 21/082; G08B 21/088; G08B 21/084; G08B 13/1609; G08B 29/185; G08B 29/24; A62B 99/00
USPC ..................................... 73/700–756
See application file for complete search history.

(56) References Cited

U.S. PATENT DOCUMENTS

| | | | |
|---|---|---|---|
| 3,760,396 A | 9/1973 | Haselton | |
| 3,810,146 A | 5/1974 | Lieb | |
| 4,121,200 A | 10/1978 | Colmenero | |
| 4,187,502 A * | 2/1980 | Beverly | G08B 21/082 367/93 |
| 4,602,344 A | 7/1986 | Ferretti et al. | |
| 4,821,569 A | 4/1989 | Soltz | |
| 4,901,245 A | 2/1990 | Olson et al. | |
| 4,932,009 A | 6/1990 | Lynch | |
| 5,023,593 A | 6/1991 | Brox | |
| 5,043,705 A | 8/1991 | Rooz et al. | |
| 5,049,859 A | 9/1991 | Arnell | |
| 5,091,714 A | 2/1992 | De Solminihac | |
| 5,121,104 A * | 6/1992 | Nelson | G08B 21/082 367/136 |

(Continued)

FOREIGN PATENT DOCUMENTS

| | | | | |
|---|---|---|---|---|
| EP | 3714444 A1 * | 9/2020 | ............. | G08B 21/08 |
| FR | 2763684 A1 * | 11/1998 | ........... | B63C 9/0005 |

(Continued)

OTHER PUBLICATIONS

"Standard Safety Specification for Residential Pool Alarms", ASTM International, Designation: F2208-08 (Reapproved 2019), 4 pgs.

(Continued)

*Primary Examiner* — Andre J Allen
(74) *Attorney, Agent, or Firm* — HAYES SOLOWAY P.C.

(57) ABSTRACT

A method for detecting an entry of an object into a pool includes providing at least one underwater sensor enclosure; providing at least one above ground sensor enclosure; calculating an average underwater pressure; calculating an average above ground pressure; calculating a change in moving average differential pressure by subtracting the average above ground pressure from the average underwater pressure; calculating a mass of an entrant object by multiplying a calibration factor by the change in moving average differential pressure; and alerting a user of the mass of the entrant object, whereby a positive mass represents water entry and a negative mass represents water exit.

13 Claims, 13 Drawing Sheets

(56) References Cited

U.S. PATENT DOCUMENTS

| | | |
|---|---|---|
| 5,144,285 A | 9/1992 | Gore |
| 5,268,673 A * | 12/1993 | Nelson ................. G08B 21/082 |
| | | 367/136 |
| 5,369,623 A | 11/1994 | Zerangue |
| 5,638,048 A | 6/1997 | Curry |
| 5,887,479 A | 3/1999 | Swanson |
| 5,903,218 A | 5/1999 | Nelson |
| 6,133,838 A | 10/2000 | Meniere |
| 6,317,050 B1 | 11/2001 | Burks |
| 6,642,847 B1 | 11/2003 | Sison |
| 7,019,649 B2 | 3/2006 | Hoenig |
| 7,170,416 B2 | 1/2007 | Philippe et al. |
| 7,287,425 B2 | 10/2007 | Lagergren |
| 7,330,123 B1 | 2/2008 | Grahn et al. |
| 7,427,923 B2 | 9/2008 | Durand |
| 2001/0048365 A1 | 12/2001 | McFarand |
| 2004/0095248 A1 | 5/2004 | Mandel |
| 2005/0035866 A1 | 2/2005 | Hatherell et al. |
| 2008/0084318 A1 | 4/2008 | Fogelson et al. |
| 2008/0174441 A1 * | 7/2008 | Durand ................. G08B 21/084 |
| | | 340/573.6 |
| 2010/0176956 A1 * | 7/2010 | Moerschell ................ E04H 4/06 |
| | | 340/626 |
| 2021/0327246 A1 * | 10/2021 | Shlomovitz .......... G08B 21/086 |

FOREIGN PATENT DOCUMENTS

| | | | |
|---|---|---|---|
| FR | 2878058 A1 * | 5/2006 | ........... G08B 21/082 |
| WO | 020101678 A1 | 12/2002 | |

OTHER PUBLICATIONS

"NA4212—Poolwatch Pool Alarm System", Blue Wave Poolwatch Pool Alarm System Item NA4212 Manual, found at https://images.salsify.com/image/upload/s---cLp1g8d--/apasl8ipti3nqdmkx8ru.pdf, accessed Jun. 12, 2024, 15 pgs.

* cited by examiner

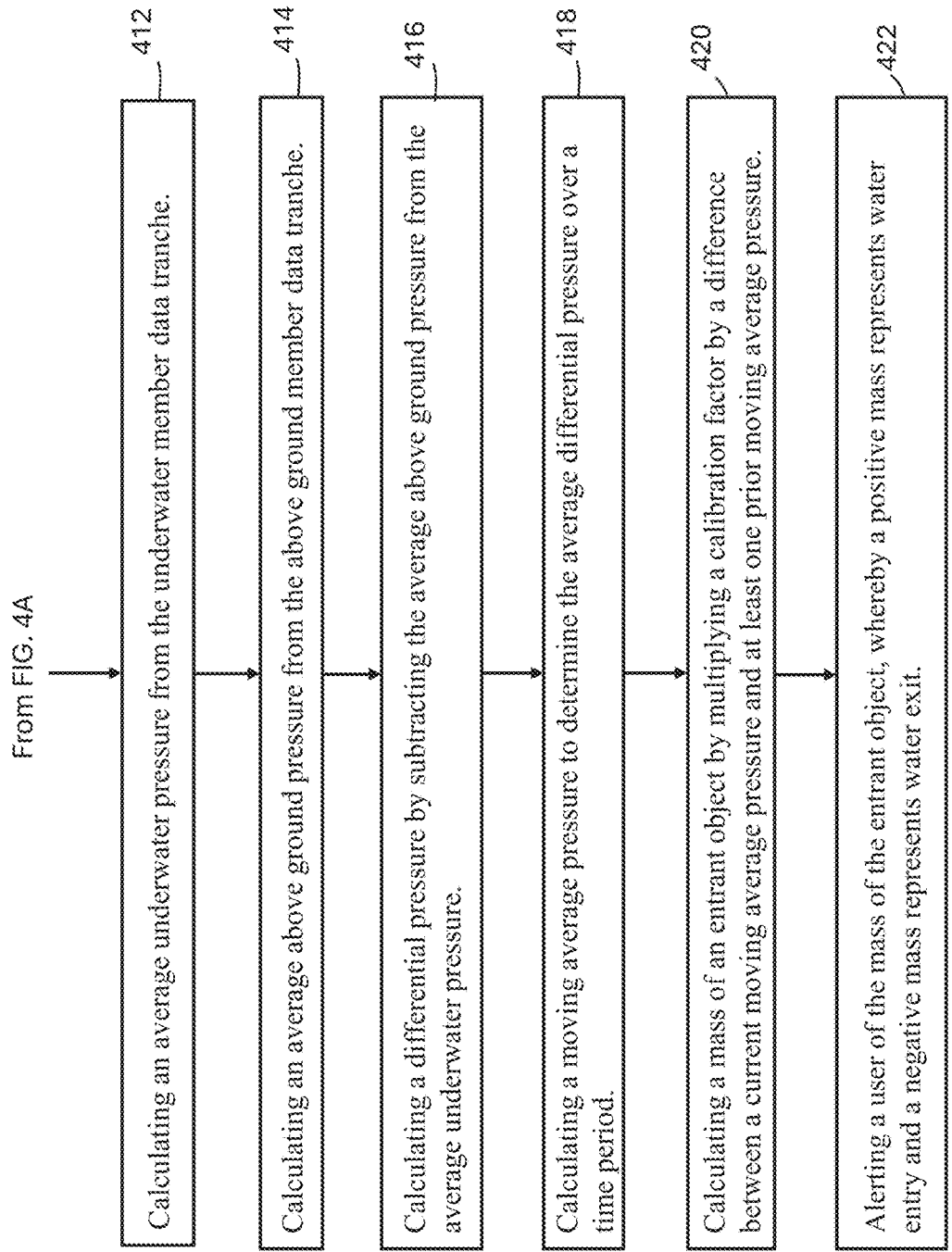

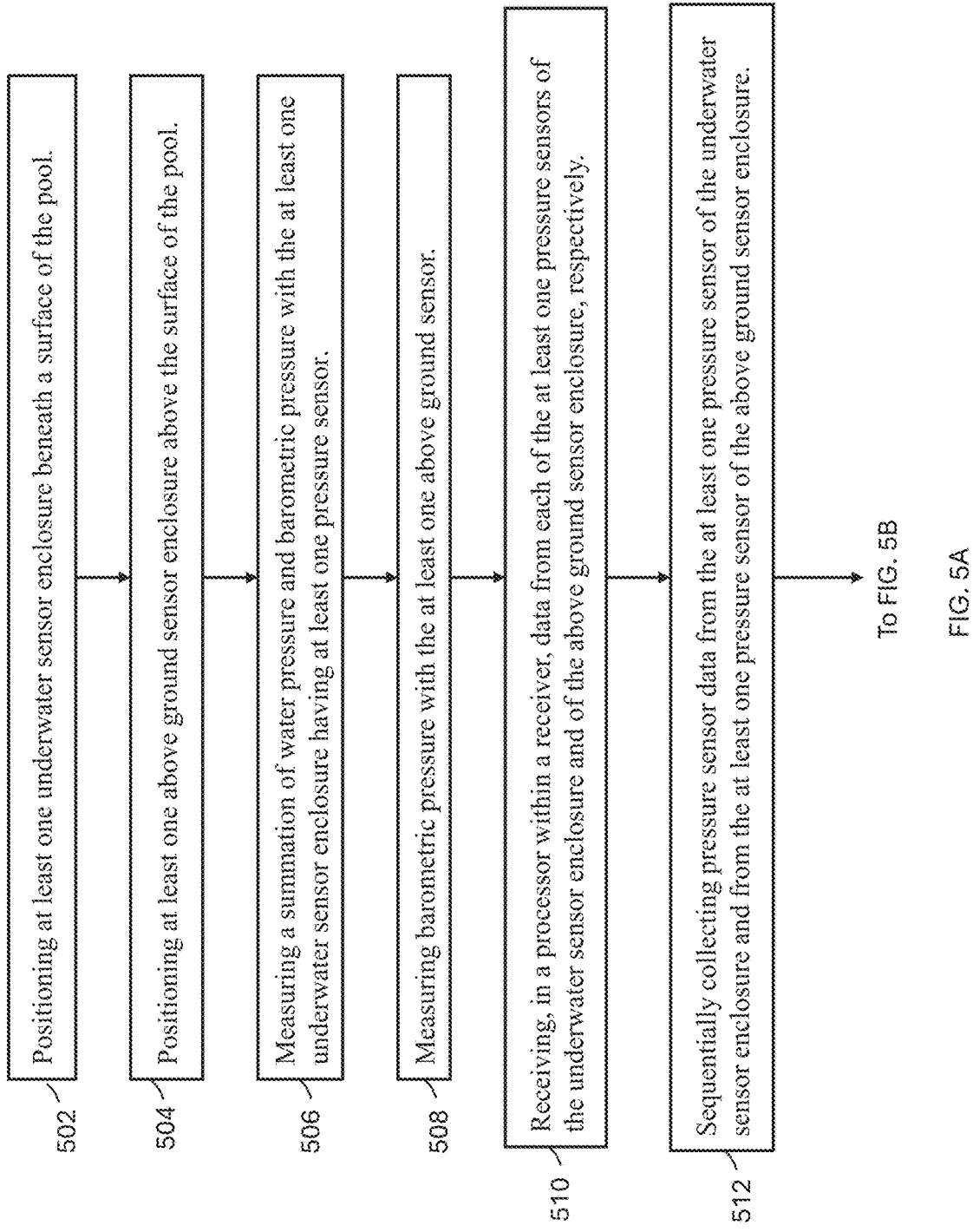

Method For Sensing An Entry Of An Object Into A Pool

From FIG. 5A

514 — Defining a pair of pressure data tranches within the processor to comprise: an underwater member data tranche having data collected from the at least one pressure sensor of the underwater pressure sensor enclosure, and an above ground member data tranche having data collected from the at least one pressure sensor of the above ground pressure sensor enclosure, whereby the data from each of the members of the pair were collected at substantially the same time.

516 — Further configuring the processing unit for: calculating an average underwater pressure from the underwater member data tranche; calculating an average above ground pressure from the above ground member data tranche; calculating a differential pressure by subtracting the average above ground pressure from the average underwater pressure; calculating a first moving average differential pressure to determine the average differential pressure over a time period; calculating a second moving average differential pressure at a time gap before the first moving average is determined; calculating a change in moving average change differential pressure by subtracting the second moving average differential pressure from the first moving average differential pressure; calculating a mass of an entrant object by multiplying a calibration factor by a difference of a current moving average differential pressure with at least one prior moving average differential pressure.

518 — Alerting a user of the mass of the entrant object, whereby a positive mass represents water entry and a negative mass represents water exit.

FIG. 5B

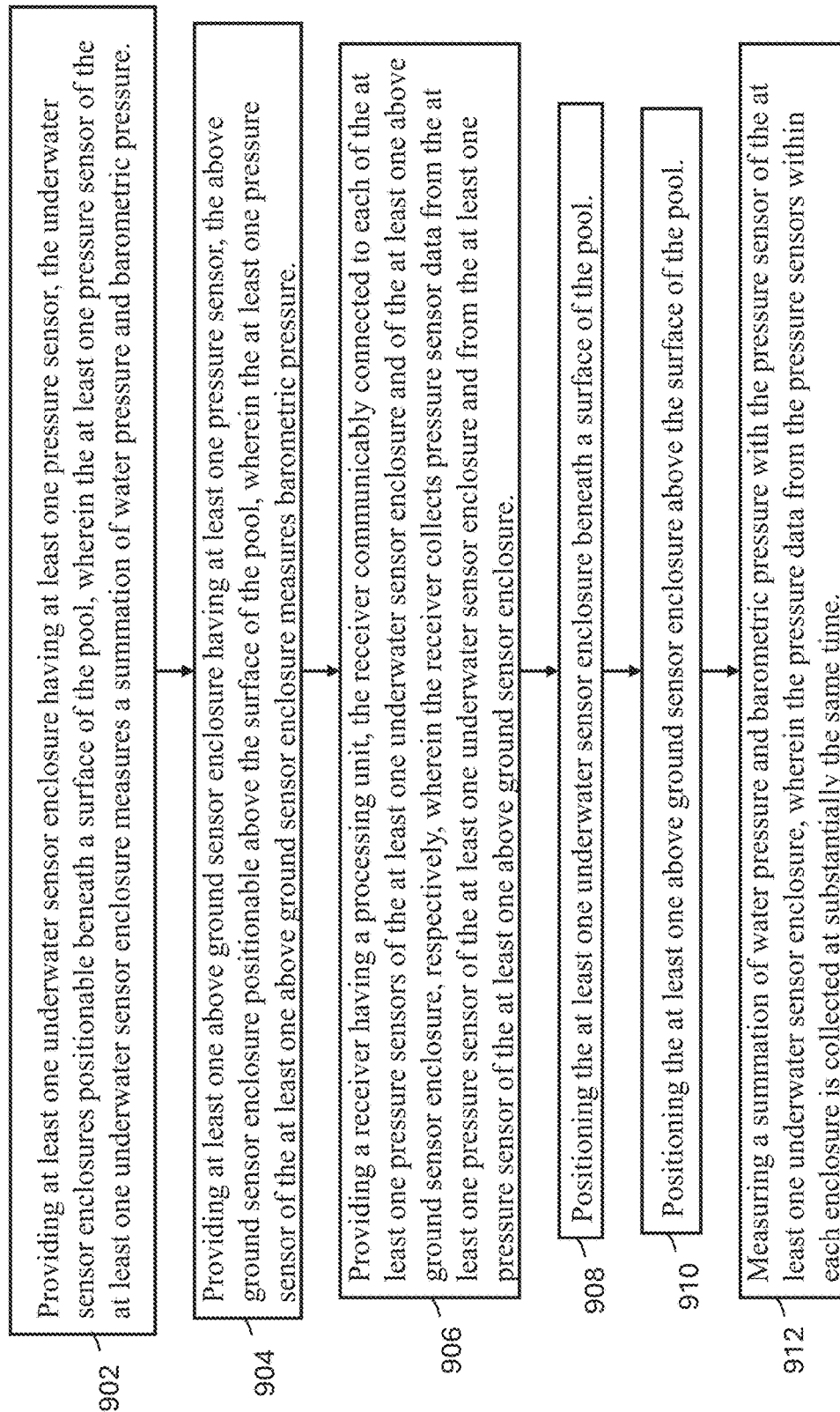

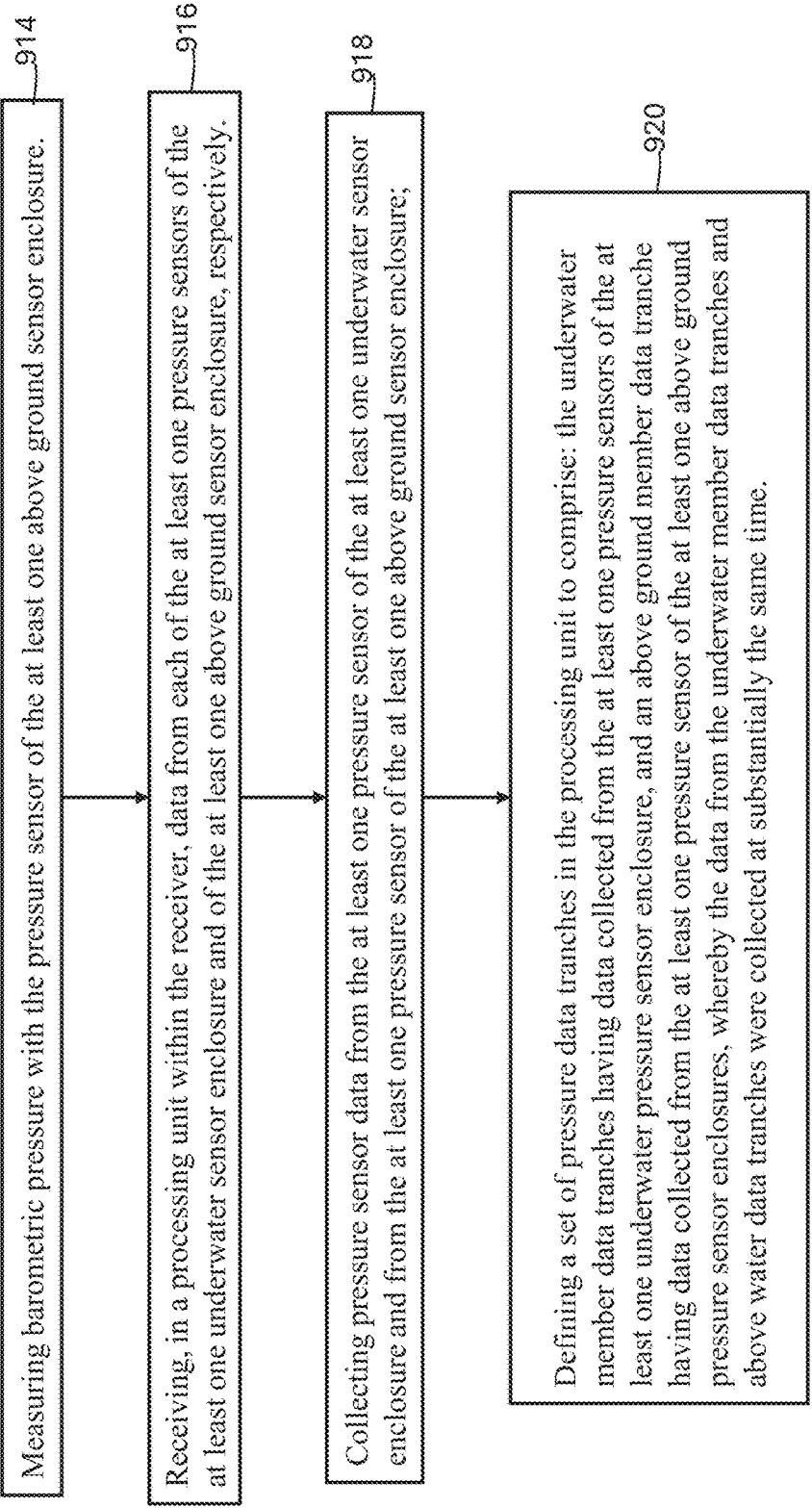

Method For Detecting An Entry Of An Object Into A Pool

From FIG. 9B wherein the processing unit performs a data processing method having the steps of: calculating an average underwater pressure from the underwater member data tranches of the set; calculating an average above ground pressure from the above ground member data tranches of the set; calculating a differential pressure by subtracting the average above ground pressure from the average underwater pressure; calculating a first moving average differential pressure to determine the average differential pressure over a time period; calculating a second moving average differential pressure at a time gap before the first moving average is determined; calculating a change in moving average differential pressure by subtracting the second moving average differential pressure from the first moving average differential pressure; calculating a mass of an entrant object by multiplying a calibration factor by the change in moving average differential pressure; and alerting a user of the mass of the entrant object, whereby a positive mass represents water entry and a negative mass represents water exit.

FIG. 9C

DIFFERENTIAL PRESSURE DETECTOR AND METHOD FOR SENSING BODY FALL INTO POOL

FIELD OF THE DISCLOSURE

The present disclosure is generally related to water safety devices and more particularly is related to differential pressure detectors and methods for sensing a body fall into pool.

BACKGROUND OF THE DISCLOSURE

Swimming pool drowning accidents lead to hundreds of fatalities and injuries yearly. Several devices have been developed to address this. Each has deficiencies that, as described below, have prevented their widespread acceptance and use.

Several devices have been conceived for determining if a body falls into a swimming pool, some particularly for children. For example, some devices must be worn by a child to set off the alarm if the child enters the water. Although such devices are very effective and are not subject to false alarms, they have the significant disadvantage that they require that the child be willing to always wear the belt and will not detect a child that has fallen into a pool that is not wearing the transmitter.

Other alarm devices for pools have also been conceived including those which sense water disturbances created by a person in a swimming pool. Such devices generally use passive infrared and acoustic sensors for detecting if a person has fallen into a pool. An infrared detector detects heat, and the acoustic element detects waves generated as the body struggles at or below the water surface. Some examples further use a hydrophone to detect acoustic noises when a person falls in a pool.

Typical devices which do not require that a transmitter be worn by a person, and which rely on ultrasonic or electromagnetic signals are devices that transmit a signal through the pool to a receiving transducer. Entry of a person is detected by disruption of the signal. Although these devices are apparently useful, they suffer from shortcomings in that they may not be able to detect the presence of a foreign body in the corners of the pool nearest the transmitting and receiving transducers because the corners of the pool may not be within the signal cones produced by the transmitting transducer. Some examples utilize a plurality of transducers mounted on a support which send and receive acoustic energy into the water of the swimming pool and a control means for activating a transducer to generate a series of pulses from the transducers and a means responsive to changes in the reflected echo pattern received at one of the transducers before the expiration of a pre-determined time period and thus indicative of a foreign body in the transmission path for generating an alarm. Examples as such rely on receiving an echo pulse from the foreign body in the pool before the expiration of a predetermined time period.

Similarly, optical systems using either cameras or lasers could suffer from blind spots or the presence of foreign material in the water.

Another class of devices senses either wave motion or use a hydrophone to detect pressure waves. Both techniques require that the entry of the person into the water be distinguishable from the wind or other objects that may fall into the pool.

Some devices use a pressure switch to measure an increase in pool water level as an indication of entry of a body into a pool. In these examples, pressure switches communicate to the pool through a throttled inlet line. The effect of wave action is dampened through use of this throttle. The throttle setting is a compromise between providing a rapid response and allowing excessive false alarms, or slower response and fewer false alarms. Such alarm systems may provide for automatic adjustment for the switch to compensate for gradual changes in pool water level due to rain and evaporation. However, due to the nature of the electromechanical design, the alarm must be disabled during these automatic adjustments, and thus leaves the pool unprotected during these adjustment intervals.

Other examples may use a combination of two signals such as both underwater pressure and surface motion to detect an entrant object. Surface motion alone can lead to spurious alarms. This may be mitigated by the conjunction of two signals. Surface motion is dependent on both proximity and shape of the pool. For example, in a concave polygon shaped pool, the pool walls between the detector and entrance point would dampen the surface motion. In this case the pressure sensor was used to detect wave action. The instant invention utilizes pressure sensors to detect the increase in water pressure due to an increase in water level.

Other pool sensors may employ the use of a pressure sensor to determine a change in the steady state pool level to determine the presence and weight of an object that fell in the pool. However, in these examples, highly precise pressure readings are required to detect subtle increases in water level. Additionally, these readings may be confounded by excessive noise and drift.

In view of the foregoing there is a need for a swimming pool alarm which would provide a rapid response in the event of a body falling into the pool yet not suffer from excessive false alarms, be independent of pool geometry, not require the presence of physical barriers, not require that the entrant person wear a particular device, not have blind spots, and not depend on or be affected by noise or wave action generated by the entrant person. The last item is particularly important for young children or others having a physiological condition such that they may not be able to generate enough wave action to trigger an alarm.

SUMMARY OF THE DISCLOSURE

Embodiments of the present disclosure provide an apparatus for detecting the entry of an object into a pool. Briefly described, one embodiment of the method, among others, can be broadly summarized by the following steps: Providing at least one underwater sensor enclosure having at least one pressure sensor, the underwater sensor enclosures positionable beneath a surface of the pool, wherein the at least one pressure sensor of the at least one underwater sensor enclosure measures a summation of water pressure and barometric pressure; providing at least one above ground sensor enclosure having at least one pressure sensor, the above ground sensor enclosure positionable above the surface of the pool, wherein the at least one pressure sensor of the at least one above ground sensor enclosure measures barometric pressure; a receiver having a processing unit, the receiver communicably connected to each of the at least one pressure sensors of the at least one underwater sensor enclosure and of the at least one above ground sensor enclosure, respectively, wherein the receiver collects pressure sensor data from the at least one pressure sensor of the at least one underwater sensor enclosure and from the at least one pressure sensor of the at least one above ground sensor enclosure; positioning the at least one underwater sensor enclosure beneath a surface of the pool; positioning the at least one above ground sensor enclosure above the surface of the pool; measuring a summation of water pressure and barometric pressure with the pressure sensor of the at least one underwater sensor enclosure, wherein the pressure data from the pressure sensors within each enclosure is collected at substantially the same time; measuring barometric pressure with the pressure sensor of the at least one above ground sensor enclosure; receiving, in a processing unit within the receiver, data from each of the at least one pressure sensors of the at least one underwater sensor enclosure and of the at least one above ground sensor enclosure, respectively; collecting pressure sensor data from the at least one pressure sensor of the at least one underwater sensor enclosure and from the at least one pressure sensor of the at least one above ground sensor enclosure; defining a set of pressure data tranches in the processing unit to comprise: the underwater member data tranches having data collected from the at least one pressure sensors of the at least one underwater pressure sensor enclosure, and an above ground member data tranche having data collected from the at least one pressure sensor of the at least one above ground pressure sensor enclosures, whereby the data from the underwater member data tranches and above water data tranches were collected at substantially the same time, wherein the processing unit performs a data processing method having the steps of: calculating an average underwater pressure from the underwater member data tranches; calculating an average above ground pressure from the above ground member data tranches of the set; calculating a differential pressure by subtracting the average above ground pressure from the average underwater pressure of the set; calculating a first moving average differential pressure to determine the average differential pressure over a time period; calculating a second moving average differential pressure at a time gap before the first moving average is determined; calculating a change in moving average differential pressure by subtracting the second moving average differential pressure from the first moving average differential pressure; calculating a mass of an entrant object by multiplying a calibration factor by the change in moving average differential pressure; and alerting a user of the mass of the entrant object, whereby a positive mass represents water entry and a negative mass represents water exit.

The present disclosure can also be viewed as providing methods for detecting an entry of an object into a pool. In this regard, one embodiment of such a method, among others, can be broadly summarized by the following steps: measuring a summation of water pressure and barometric pressure with at least one underwater sensor positionable beneath a surface of the pool; measuring barometric pressure with at least one above ground sensor positionable above the surface of the pool; receiving, in a receiver, data from each of the at least one underwater sensors and of the above ground sensors, respectively; collecting pressure sensor data from the at least one underwater sensor and from the at least one above ground sensor; defining a pair of pressure data tranches to comprise: an underwater member data tranche having data collected from the at least one pressure sensor of the underwater pressure sensor enclosure, and an above ground member data tranche having data collected from the at least one pressure sensor of the above ground pressure sensor enclosure whereby the data from each of the members of the pair were collected at substantially the same time; calculating an average underwater pressure from the underwater member data tranche; calculating an average above ground pressure from the above ground member data tranche; calculating a differential pressure by subtracting the average above ground pressure from the average underwater pressure; calculating a differential pressure by subtracting the average above ground pressure from the average underwater pressure; calculating a moving average pressure to determine the average differential pressure over a time period; calculating a mass of an entrant object by multiplying a calibration factor by a difference of a current moving average pressure with at least one prior moving average pressure; and alerting a user of the mass of the entrant object, whereby a positive mass represents water entry and a negative mass represents water exit.

The present disclosure can also be viewed as providing methods for detecting an entry of an object into a pool. In this regard, one embodiment of such a method, among others, can be broadly summarized by the following steps: positioning at least one underwater sensor enclosure beneath a surface of the pool; positioning at least one above ground sensor enclosure above the surface of the pool; measuring a summation of water pressure and barometric pressure with the at least one underwater sensor enclosure having at least one pressure sensor; measuring barometric pressure with the at least one above ground sensor; receiving, in a processing unit within a receiver, data from each of the at least one pressure sensors of the underwater sensor enclosure and of the above ground sensor enclosure, respectively; sequentially collecting pressure sensor data from the at least one pressure sensor of the underwater sensor enclosure and from the at least one pressure sensor of the above ground sensor enclosure; defining a pair of pressure data tranches in the processing unit to comprise: an underwater member data tranche having data collected from the at least one pressure sensor of the underwater pressure sensor enclosure, and an above ground member data tranche having data collected from the at least one pressure sensor of the above ground pressure sensor enclosure, whereby the data from each of the members of the pair were collected at substantially the same time, wherein the processing unit is further configured for: calculating an average underwater pressure from the underwater member data tranche; calculating an average above ground pressure from the above ground member data tranche; calculating a differential pressure by subtracting the average above ground pressure from the average underwater pressure; calculating a first moving average differential pressure to determine the average differential pressure over a time period; calculating a second moving average differential pressure at a time gap before the first moving average is determined; calculating a change in moving average change differential pressure by subtracting the second moving average differential pressure from the first moving average differential pressure; calculating a mass of an entrant object by multiplying a calibration factor by a difference of a current moving average differential pressure with at least one prior moving average differential pressure; and alerting a user of the mass of the entrant object, whereby a positive mass represents water entry and a negative mass represents water exit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4B illustrate a flowchart method for detecting an entry of an object into a pool.

FIGS. 5A-5B illustrate a flowchart method for detecting an entry of an object into a pool.

FIGS. 9A-9C illustrate a flowchart method for detecting an entry of an object into a pool.

DETAILED DESCRIPTION

Figure 1:
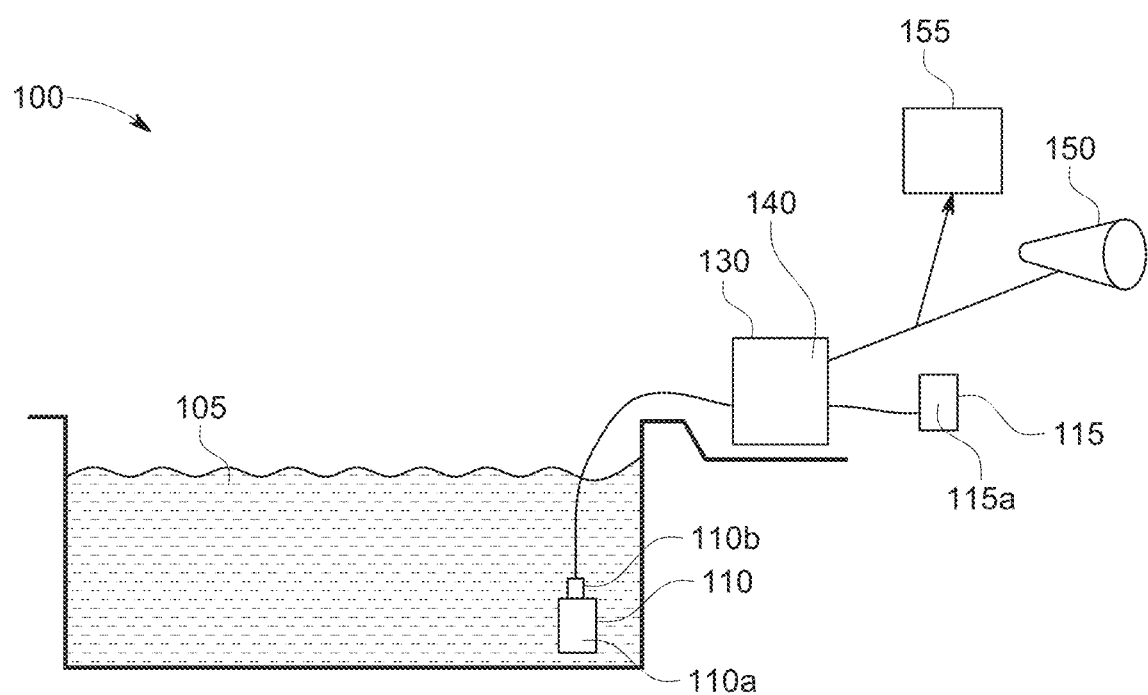
FIG. 1 illustrates a side view of a system for detecting entry of an object into a pool configured for use in a pool.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a side view of a system 100 for detecting entry of an object into a pool 105 configured for use in the pool 105. The system 100, its components, and data processing can be better understood with reference to FIG. 2. The detailed process for collecting pressure data 200 will be discussed further below. The system 100 has an underwater sensor enclosure 110 having at least one pressure sensor 110a, the underwater sensor enclosure positionable beneath a surface of the pool 105. At least one pressure sensor 110a of the underwater sensor enclosure 110 measures a summation of water pressure and barometric pressure. An above ground sensor enclosure 115 has at least one pressure sensor 115a. The above ground sensor enclosure 115 is positionable above the surface of the pool 105. The at least one pressure sensor 115a of the above ground sensor enclosure 115 measures barometric pressure. A receiver 130 has a processing unit 140. The receiver 130 is communicably connected to each of the at least one pressure sensors 110a, 115a of the underwater sensor enclosure 110 and of the above ground sensor enclosure 115, respectively, wherein the receiver 130 sequentially collects pressure sensor data 200 from the at least one pressure sensor 110a of the underwater sensor enclosure 110 and from the at least one pressure sensor 115a of the above ground sensor enclosure 115. The processing unit 140 may process sequential pairs of pressure data tranches 210, 215, where each pair of pressure data tranches 210, 215 may have an underwater member data tranche 210 having pressure data 200 collected from the at least one pressure sensor 110a of the underwater pressure sensor enclosure 110, and an above ground member data tranche 215 having pressure data 200 collected from the at least one pressure sensor 115a of the above ground pressure sensor enclosure 115. The processing unit 140 may be configured to store the pairs of pressure data tranches 210, 215; calculate an average underwater pressure from the underwater member data tranche 210; calculate an average above ground pressure from the above ground member data tranche 215; calculate a differential pressure by subtracting the average above ground pressure from the average underwater pressure; calculate a first moving average to determine the average differential pressure over a time period; calculate a second moving average at a time gap before the first moving average is determined; calculate the moving average change by subtracting the second moving average from the first moving average; and calculate a mass of an entrant object by multiplying a calibration factor with the moving average change.

Figure 2:
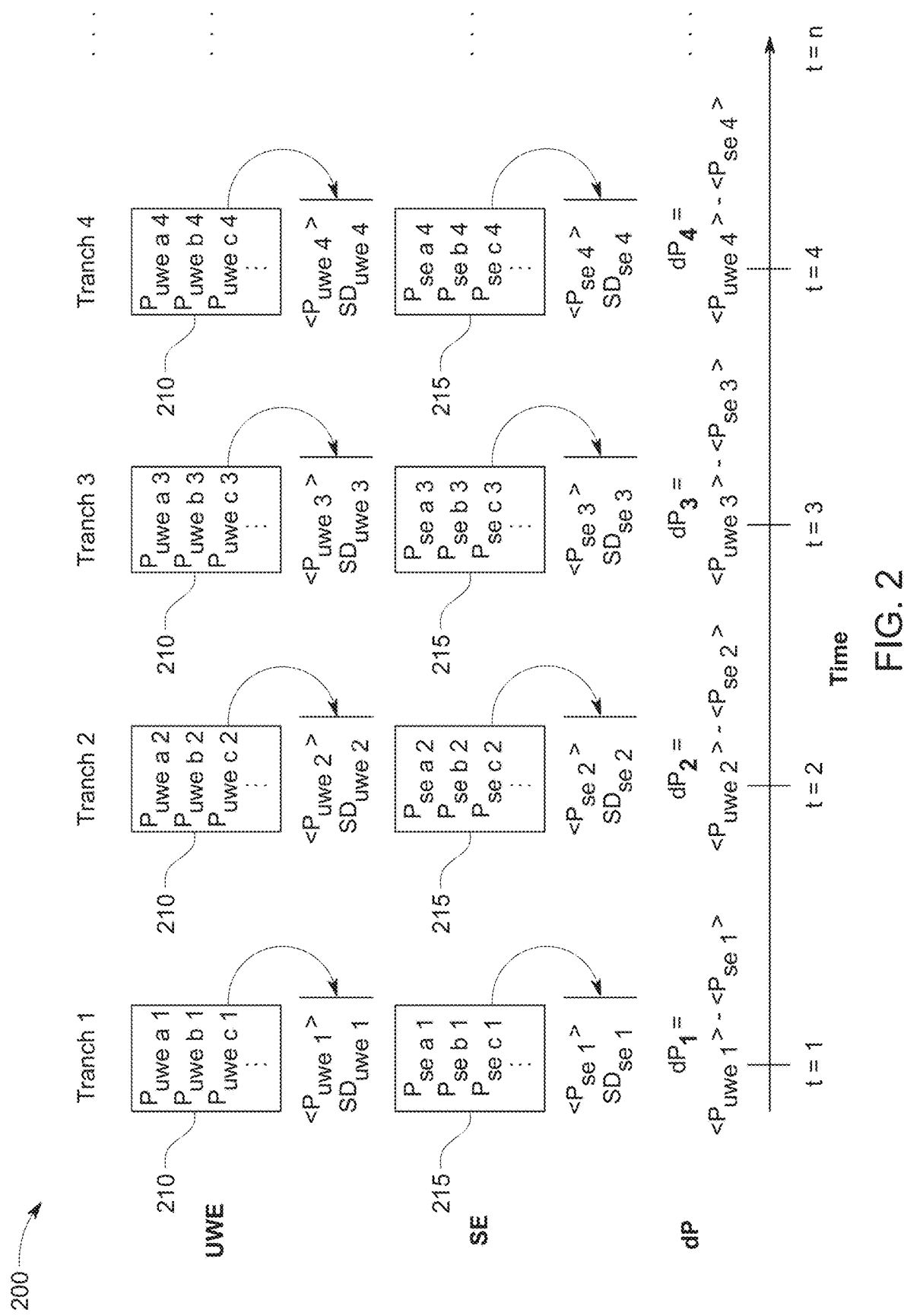
FIG. 2 illustrates a process for collecting pressure data, where the pressure data is batched into tranches.

FIG. 2 illustrates collection of pressure data 200, where the pressure data 200 may be batched into data tranches 210, 215 or data members. With reference to FIG. 1, the pressure data tranches 210, 215 may have at least two data members, an underwater member data tranche 210, which has data collected from the underwater pressure sensor enclosure 110 and an above ground member data tranche 215 tranche having data collected from above ground pressure sensor enclosure 115. Data may be gathered by each of the pressure sensor enclosures 110, 115 at substantially the same time, and then grouped, forming a tranche. Each tranche represents a grouping or collection of pressure data at a given time. For example, each data tranche is given a time, tranche 1 is T=1 second, tranche 2 is T=2 seconds, etc. Within the tranche, data may be collected at the millisecond level, or at any time frame less than that of the tranche level. Thus, each tranche of 210 and 215 has a plurality of data measurements for the pressure measured by the pressure sensor enclosures 110, 115, respectively.

Figure 3:
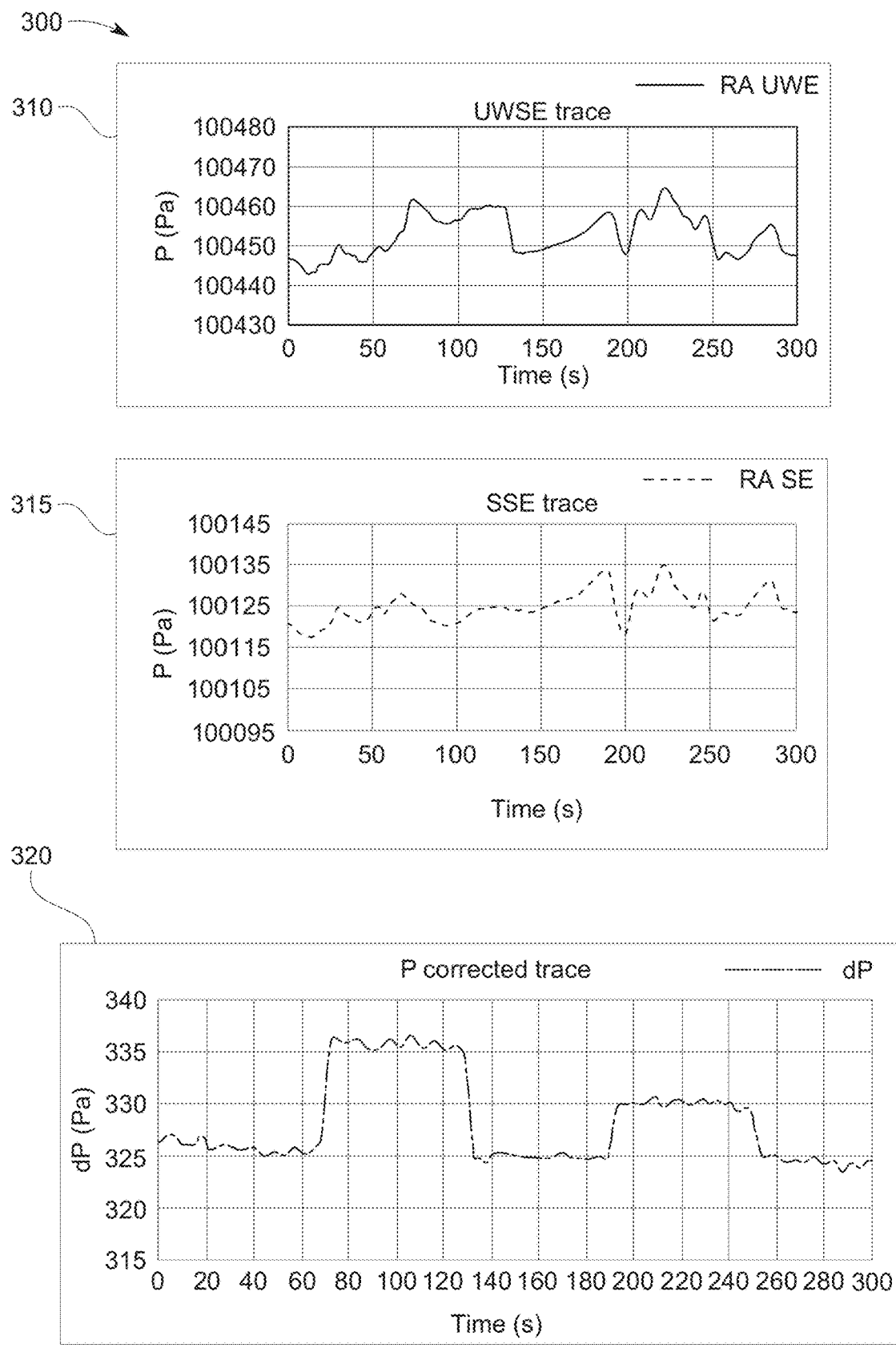
FIG. 3 illustrates graphs of pressure readings from each of the sensor enclosures and a barometric pressure corrected trace graph.

FIG. 3 illustrates graphs of pressure readings 300 from each of the sensor enclosures 110, 115 (FIG. 1) and a barometric pressure corrected trace graph 320. Correction may be performed by subtracting the above ground pressure sensor data points 315 from the underwater pressure sensor data points 310. This calculation yields barometric pressure corrected data illustrated in the differential pressure graph 320, where significant changes in pressure can be analyzed. Significant changes in pressures are pressure changes caused by events other than general changes in barometric pressure or other weather conditions.

A further description of the system 100 is provided herein. The system 100 can be best understood with reference to FIGS. 1-3. The system 100 having the underwater sensor enclosure 110 may be positionable beneath the surface of the pool 105. The underwater sensor enclosure 110 having at least one pressure sensor 110a measures a summation of water pressure and barometric pressure. The above ground sensor enclosure 115 may be positionable above the surface of the pool 105. The above ground sensor enclosure 115 having the at least one pressure sensor 115a measures the barometric pressure. The receiver 130 may be positioned outside of the pool 105 and may have the processing unit 140 contained therein. The processing unit 140 may be made up of a processor, a memory unit, or a combination of the two. The receiver 130 may be configured to communicably connect to each of the at least one pressure sensors 110a, 115a of the underwater sensor enclosure 110 and of the above ground sensor enclosure 115, respectively. The receiver 130 may electrically connect to each of the sensor enclosures 110, 115, or may be communicably connected to each of the sensor enclosures 110, 115 by a cable, short-range wireless communication or long-range wireless communication (for example, including WiFi or cellular phone communication technology), optical, mechanical or by any combination thereof.

In one example, the underwater sensor enclosure 110 connects to the receiver 130 electrically with a cable and the above ground sensor enclosure 115 connects to the receiver 130 by either one of short-range wireless communication or long-range wireless communication. The above ground sensor enclosure 115 may also be able to interchangeably connect to the receiver 130 by alternating between short-range wireless communication and long-range wireless communication, depending on which provides a greater signal strength or other design criteria. The underwater sensor enclosure 110 may electrically connect to the receiver 130 through a wire. The wire may connect to the underwater sensor enclosure 110 through at least one connection port 110b. The communication between receiver and either above ground surface enclosure or underwater sensor enclosure may be analog or digital means. Analog means includes voltage signals such as 0-5 V, or current signals such as 20 to 100 mA used in transmitters. Digital means includes electromagnetic pulses using protocols such as RS232, USB, Firewire, ethernet, TCP/IP, CAN bus, RS485 or RS422, The at least one connection port 110b may be a waterproof connection port 110b or be capable of creating a watertight connection, such that the electrical contacts of the at least one connection port 110b remains substantially dry and able to communicate electrically to the receiver 130. In some examples, the connection ports 110b may standard waterproof connectors such as M8, M12 or similar connectors mounted to a face of the underwater sensor enclosure 110. The connectors may advantageously conform to IP67, IP68 or IP69 standards. Additionally, the pressure sensors 110a, 115a may be any sensors capable of detecting changes in pressure. In one example, the underwater sensor enclosure may be comprised of a rigid housing have a hole in the bottom, for instance, like a diving bell, to permit fluidic communication with pressure sensors therein. Such pressure sensors and/or electronics, if not intrinsically waterproof, may be disposed in the airspace above the water line within such diving bell style housing. In one example, a vapor barrier is disposed between the bottom hole and pressures sensors and electronics. In another embodiment, the pressure sensors may be enclosed within a waterproof enclosure that has at least on flexible surface that can deform in response to pressure thereby permitting sufficient fluidic communication of water pressure to the pressure sensors within the enclosure. In another embodiment, the pressure sensors that are intrinsically waterproof or portion thereof can be exposed directly to the water. The pressure sensors include piezoelectric, strain gauge, optical, potentiometric, force balancing, capacitive, electromagnetic, resonant and other types of pressure sensors In one example, the receiver 130 may be in communication with the underwater sensor enclosure 110 by wireless communication. Any suitable wireless protocols may be used, in particular, VHF on the order of 50 MHz. In exemplary calculations, with the underwater sensor enclosure 110 submerged about 2 meters, the theoretical signal loss caused by the water may be acceptable to allow the receiver 130 to receive a wireless signal from the underwater sensor enclosure 110. In one example, the receiver 130 may include an antenna, in this instance, on the order of about 3 meters long. However, an ideal antenna may not be necessary because of the proximity of the receiver and the short length of the feedline. This means that losses may be small.

The receiver 130 may be configured to sequentially collect pressure data from the at least one pressure sensor 110a of the at least one underwater sensor enclosure 110 and to collect pressure sensor data from the at least one pressure sensor 115a of the at least one above ground sensor enclosure 115. The processing unit 140 of the receiver 130 may process pairs of pressure data tranches 210, 215 or data members (i.e., for the data tranches shown in FIG. 2, a pair at t=1, a second pair at t=2 and so forth). The pressure data tranches 210, 215 may have at least two data members, an underwater member data tranche 210, which has data collected from the at least one pressure sensor 110a of the underwater pressure sensor enclosure 110 and an above ground member data tranche 215 which has data collected from the at least one pressure sensor 115a of the above ground pressure sensor enclosure 115. Data may be gathered by each of the pressure sensor enclosures 110, 115 at substantially the same time, and may then be grouped, to form a tranche 210, 215. Each tranche 210, 215 may represent a group collection of pressure data at a given time. For example, each data tranche 210, 215 is given a time, tranche 1 is T=1 second, tranche 2 is T=2 seconds, etc. Within the data tranche 210, 215, data may be collected at the millisecond time scale, or at any time frame less than that of the tranche level. Thus, each tranche 210, 215 has a plurality of data measurements for the pressure measured by the pressure sensors 110a, 115a, respectively. In another example, pressure data from the pressure sensors within their respective enclosures are collected at substantially the same time. The time interval to collect data from pressure sensors within the underwater sensor enclosure may be different from the time interval to collect the data from the pressure sensors within the above ground sensor enclosure.

The processing unit 140 may be configured for processing, storing, and conducting calculations using the data tranches 210, 215 and with any other pressure data which may be received from the pressure sensors 110a, 115a. More particularly, the processing unit 140 may be configured to store the pairs of pressure data tranches 210, 215 in a memory or a storage medium. The processing unit 140 may also be configured to contain a memory or storage unit to store the pairs of pressure data tranches 210, 215 and any other data. The storage unit may be any hardware that is capable of being used for digital storage of data. This includes solid state drives and hard drive disks. Software such as cloud storage platforms may also be used for storing or processing data, where the processing unit 140 communicates through a network to contact a cloud storage platform. The processing unit 140 may also be configured to calculate an average underwater pressure using the data from the underwater member data tranche 210. This is the average underwater pressure at a given time calculated by a plurality of pressure data points obtained from the pressure sensor 110a of the underwater sensor enclosure 110. Similarly, the processing unit 140 may also calculate the above ground pressure from the above ground member data tranche 215. This is the average barometric pressure at a given time and may be calculated by a plurality of pressure data points obtained from the pressure sensor 115a of the above ground sensor enclosure 115. The processing unit 140 may be further configured to calculate a differential pressure which is calculated by subtracting the average of the above ground member data tranche 215 from the underwater member data tranche 210.

The processing unit 140 is also configured to calculate a first moving average, which may also be a current moving average and a second moving average, which may be a prior or past moving average. The calculations of the processing unit 140 may be understood with reference to FIG. 6, which is made herein, and described in greater detail below. The first moving average is calculated (FIG. 6, reference character 615) and used with the second moving average (FIG. 6, reference character 605) to determine the cP, change in differential pressure over a time period. The second moving average is calculated at a time gap (FIG. 6, reference character 620) before the first moving average is determined. That is, the second moving average is calculated for a time prior to the first moving average. The processing unit 140 may then calculate the cP by taking a difference between the second moving average and the first moving average, i.e., by subtracting the 2nd moving average from the 1st moving average to determine the cP. In other words, the two moving averages of the first and second moving averages are compared, where the second moving average may be past-in-time data, and the first moving average may be present data. Using this, a change in pressure between the second moving average data and the first moving average data provides the cP value, which may be used to determine entry of a body into a pool 105 and estimate the buoyant mass of that body. Thus, the processing unit 140 may be able to use this information to calculate a mass of an entrant object by multiplying a calibration factor with the moving average change. In some examples, the time window under which the first moving average and second moving average can be varied, where a smaller time window may decrease sensitivity but also decreases the time taken by the processing unit 140 to detect a change in pressure. Conversely, a larger time window may increase sensitivity but increases the time taken for the processing unit 140 to detect a change in pressure. The graphs of FIG. 3 provide further clarification of the calculations where the difference between the underwater sensor data points 310 and above ground sensor data points 315 are taken to yield a barometric pressure corrected graph 320. A user of the system may not have to view the data processing and these graphs on a user interface to determine whether an individual has fallen into the pool 105. Rather, a threshold may be set within the barometric pressure corrected graph 320, where when the threshold is met or exceeded an alert is sent to either one of, or both, the speaker 150 and remote device 155. The alert may indicate that an object or individual has fallen into the pool 105 and may provide, announce, or otherwise alert a user to the weight of the individual who has fallen into the pool 105. The speaker 150 may be connected to the receiver 130, where the speaker 150 signals an alarm when the sensor enclosures 110, 115 detect a water pressure change indicating that a person or object has fallen into a pool 105. The receiver 130 may also be connected to the remote device 155, which may be any smart device, or any portable personal device or device connected via a cable, wireless or internet. The remote device 155 may signal to a user that a person or object has fallen into the pool 105. The connection between the receiver 130 to the speaker 150 and/or the remote device 155 may be an electrical connection, or through short range wireless communication or long-range wireless or network communication. In some examples, the connection from the receiver 130 to the speaker 150 may be an electrical connection by cable or wire and the connection from the receiver 130 to the remote device 155 may be through short range wireless communication or long-range wireless or network communication.

In one example, a moving average as used herein may be considered the unweighted average of the previous number of data points, k, including the current data point. In one example, for a first moving average, assume:

The data collection rate, R, is 24 Hz, so 24 tranches are collected each second; and
the first time period is 1.25 seconds;
so k=R*(time period)=24/s*1.25 s=30

In this example, 30 sequential tranches may be used in the moving average, starting with the current tranche.

Regarding the second moving average, the second time period may equal the first. The data rate may advantageously be the same for the sensors 110a, 115a of both the underwater sensor enclosure 110 and the above ground sensor enclosure 115.

For the second moving average, assume:
R is 24 Hz, so 24 tranches are collected each second; and
second time period is 1.25 s, so
k=R*(time period)=24/s*1.25 s=30,
where the time gap is 20 seconds. For the second moving average, 30 sequential tranches may be used, starting at 20 seconds before current tranche, to 21.25 sec before current tranche for a period of 1.25 s. In one example, the underwater sensor enclosure and above ground sensor enclosure sensors 110a, 115a may have slightly different data rates. Any difference in the rate of data capture may be overcome by simply matching the most recent tranches from each of the sensor groups.

In one example, other security devices may be included or used in communication with the system 100, such as motion detectors and cameras. These security devices may work to detect entrant persons or predict a likelihood of entry by visual capture of the entrant persons in or near the pool area. The sensors 110, 115a may further detect and confirm the entry into the pool 105.

For use, the system 100 may need to be calibrated. As an example, the system 100 may be calibrated as described below.

As a first step, the data may be prepared. The receiver 130 may collect data from the underwater sensor enclosure 110. When new data arrives from the underwater sensor enclosure 110 it may be compared to the latest data from the SE. If the most recent data from the SE has been used for comparison with underwater sensor enclosure 110 previously, it may be used again. A normalization offset may be applied, and the normalized data may be used in subsequent analyses. The raw data may be filtered, for instance by an intra tranche test or an inter-tranche test. An intra tranche test may determine the average and standard deviation of the pressure reading for all sensors in the underwater sensor enclosure 110 tranche. An inter tranche test may determine periodic noise (i.e. from pumps, wave action, resonant behavior, etc.), which can be mitigated by use of Fourier filters and the like. Machine learning and AI may be used to determine resonant frequencies and other factors that influence detecting pool pressure and level in a particular pool due to the effects of a pool cover, pool pumps and other environmental factors.

As a second step, the pressure sensor offset for normalization may be determined by taking stable readings of both the underwater sensor enclosure 110 and the above ground sensor enclosure 115 to be sure that the enclosures 110, 115 are shielding from air currents. Collective and individual offsets for each pressure sensor 110a, 115a may be determined.

As a third step, manual calibration of the entire system may continue. The underwater sensor enclosure 110 may be placed in the pool bottom and the SE may be placed in the shade near the pool (after normalizing the pressure sensors. A baseline reading may be determined. A 5 gallon water jug (weighing ~35 pounds) may be floated in the pool, with the actual filled weight known to the operator. The average differential pressure may be determined and recorded. The change in water pressure may be determined and recorded. A calibration coefficient may be calculated and stored for future use.

Calibration may also include the steps of submerging the pressure sensor 110a in a pool 105 such that it is positioned at the bottom of the pool 105. The pressure sensor 110a, once submerged in the pool 105, may collect pressure data for a specified period of time. At substantially the same time, the pressure sensor 115a may be positioned above the water or outside of the pool 105 and collect pressure data. The differential pressure may then be calculated by subtracting the barometric pressure measured by the pressure sensors 115a from the water pressure measured by the pressure sensors 110a. A first mass may be placed into the pool 105 and water pressure and barometric pressure data may again be collected for a specified period of time. The differential pressure may then be calculated again, accounting for the change in pressure caused by the placement of the first mass into the pool 105, which may yield a new differential pressure. The first mass may then be removed from the pool 105 and a second mass, differing in weight, may be placed in the pool 105. In some examples, the first mass may remain in the pool 105 and a second mass is added into the pool 105. Differential pressure may then be calculated again, accounting for the change in pressure caused by the placement of the second differing or additional mass into the pool 105, yielding a yet another differential pressure value. These steps may be repeated as many times as is necessary to generate a calibration curve of entrant mass versus differential pressure. These calculations may form the basis for the calibration factor, which may be used by the system 100 as described previously, where the calibration factor may be multiplied by the change in the moving average pressure, cP. This calculation may yield a numerical mass value of the entrant person. Where the entrant body is denser than water, the detected mass is proportional to the volume of the entrant body. For example, if a 6-pound entrant body was 3 times denser than water, the detected mass would be only 2 pounds. However, most people and animals are not much denser than water, and, in fact are often buoyant.

In one example, the underwater sensor enclosure 110 is advantageously disposed securely on or to an underwater surface of the pool. Changes in pool water level due to an entrant body are small. For example, entrance of a 20-pound body into a pool 105 having a 500 square foot surface area will increase the water level by only 0.2 mm. In one example, the underwater sensor enclosure 110 is connected to an underwater pool surface by a connection means including one or more of screws, bolts, cement or adhesive etc. In another example, the properties of the underwater sensor enclosure 110 may provide a high enough mass, low enough vertical cross-sectional area, and high enough apparent density that it is not dislodged (for example, by water currents due to nearby swimmers) and stays in place during routine use. In another example, the underwater sensor enclosure 110 weighs about 20 pounds or more, has a height less than 6 inches, has a maximum vertical cross-sectional area of 60 sq inches or less and an apparent density greater than 2. The apparent density may be understood as the mass of the device divided by the total volume of the enclosure, including the air pocket within and an attached ballast plate (which may be a heavy metal plate used to increase the apparent density of the device to help weigh down the device).

It may be advantageous to dispose the underwater sensor enclosure 110 in the deep end of the pool 105. Wave action and surface disturbances may lead to increased signal noise. Location of the underwater sensor enclosure 110 in bottom of the deep end places it further from the water surface thereby reducing such signal noise. Moreover, pools 105, if not properly kept filled, may experience low water levels. If a small amount of water remains, it will collect in the deep end. Unless the underwater sensor enclosure 110 is located in this deep end, it would not be able to provide a signal in case a body enters this remaining water.

The above ground sensor enclosure 115 may be disposed near the pool 105. If the pool 105 is outdoors, the above ground sensor enclosure 115 is preferably disposed outdoors. The above ground sensor enclosure 115 is preferably disposed securely in the shade (not in direct sunlight) in a location where it would not be dislodged (for example, by people or weather conditions) or otherwise disturbed. Note that the entrance weight calculations are based on differential pressure dP (pressure measured by the underwater sensor enclosure 110 minus the pressure measured by the above ground sensor enclosure 115). That is, a decrease in pressure measured by the above ground sensor enclosure 115 by 2 Pa (if somebody picked up the surface sensor an raised it) would increase the dP and would be equivalent to an increase in pressure measured by the underwater sensor enclosure 110. Hence, the above ground sensor enclosure 115 may be securely disposed to its position, for the same reason that the underwater sensor enclosure 110 is securely disposed to its position.

Figure 4A:
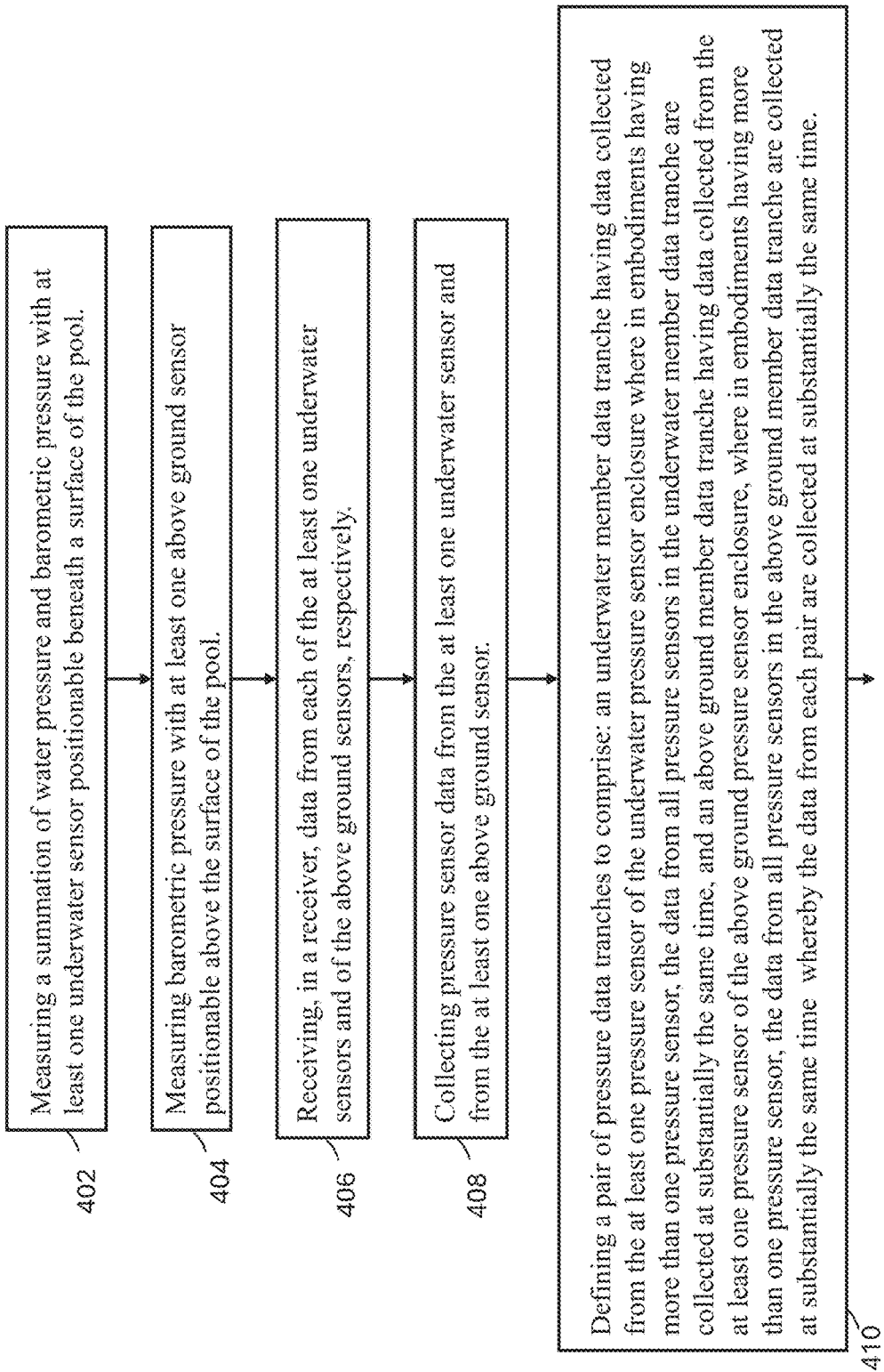

FIGS. 4A-4B illustrate a flowchart 400 method for sensing an entry of an object into a pool in accordance with the present disclosure. Both FIGS. 4A and 4B together make a complete flowchart 400. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 402 includes measuring a summation of water pressure and barometric pressure with at least one underwater sensor positionable beneath a surface of the pool. Step 404 includes measuring barometric pressure with at least one above ground sensor positionable above the surface of the pool. Step 406 includes receiving, in a receiver, data from each of the at least one underwater sensors and of the above ground sensors, respectively. Step 408 includes collecting pressure sensor data from the at least one underwater sensor and from the at least one above ground sensor. Step 410 includes defining a pair of pressure data tranches to comprise: an underwater member data tranche having data collected from the at least one pressure sensor of the underwater pressure sensor enclosure where in embodiments having more than one pressure sensor, the data from all pressure sensors in the underwater member data tranche are collected at substantially the same time, and an above ground member data tranche having data collected from the at least one pressure sensor of the above ground pressure sensor enclosure, where in embodiments having more than one pressure sensor, the data from all pressure sensors in the above ground member data tranche are collected at substantially the same time whereby the data from each pair are collected at substantially the same time.

In step 410, collecting the data from all the pressure sensors in the underwater member data tranche may be understood to mean that data from each of the pressure sensors inside the underwater sensor enclosure is collected contemporaneously within less than 1 ms, or less than 2 ms, or less than 4 ms, or less than 8 ms or less than 10 ms or less than 20 ms or less than 40 ms or less than 80 ms or less than 100 ms, or less than 200 ms or less than 400 ms or less than 800 ms or less than 1000 ms or less than 2 s or less than 4 s or less than 8 s. Collecting the data from all pressure sensors in the above ground member data tranche at substantially the same time may be understood to mean that data from each of the pressure sensors inside the above ground sensor enclosure is collected contemporaneously within less than 1 ms, or less than 2 ms, or less than 4 ms, or less than 8 ms or less than 10 ms or less than 20 ms or less than 40 ms or less than 80 ms or less than 100 ms, or less than 200 ms or less than 400 ms or less than 800 ms or less than 1000 ms or less than 2 s or less than 4 s or less than 8 s. The data from each pair of pressure data tranches may be collected at substantially the same time, which may be understood to mean that data for the above ground member tranche and the underwater member tranche are both collected contemporaneously, within less than 2 ms, or less than 4 ms, or less than 8 ms or less than 10 ms or less than 20 ms or less than 40 ms or less than 80 ms or less than 100 ms, or less than 200 ms or less than 400 ms or less than 800 ms or less than 1000 ms or less than 2 s or less than 4 s or less than 8 s or less than 16 sec of one another. It should be noted that the collection time for the pair of pressure data tranches may generally be longer than the collection time for the data gathered by the pressure sensors within each of the underwater sensor enclosure and the above ground sensor enclosure. In another example, the pressure data from the pressure sensors within their respective enclosures are collected at substantially the same time. The time interval to collect data from pressure sensors within the underwater sensor enclosure may be different from the time interval to collect the data from the pressure sensors within the above ground sensor enclosure.

Step 412 includes calculating an average underwater pressure from the underwater member data tranche. Step 414 includes calculating an average above ground pressure from the above ground member data tranche. Step 416 includes calculating a differential pressure by subtracting the average above ground pressure from the average underwater pressure. Step 418 includes calculating a moving average pressure to determine the average differential pressure over a time period. Step 420 includes calculating a mass of an entrant object by multiplying a calibration factor by a difference between a current moving average pressure and at least one prior moving average pressure. Step 422 includes alerting a user of the mass of the entrant object, whereby a positive mass represents water entry, and a negative mass represents water exit. The user may be alerted to the mass of the entrant object by the speaker playing a sound audible to the user, where the sound calls out or announces the mass or weight of the entrant object. The user may also be alerted through notification on a smart device or other remote device.

Where a plurality of underwater sensor enclosures and a plurality of above ground sensor enclosures are used (see FIG. 7 and FIG. 8), and with reference to FIGS. 4A-4B, step 410 is directed to defining a set of pressure data tranches to comprise: an underwater member data tranche having data collected
from the at least one pressure sensor of the underwater pressure sensor enclosure in each of a multiplicity of underwater enclosures where in embodiments having more than one pressure sensor, the data from all pressure sensors in each of the multiplicity of underwater member data tranches are
collected at substantially the same time, and an above ground member data tranche having data collected from the
at least one pressure sensor of each of the multiplicity of above ground pressure sensor enclosures, where in embodiments having more
than one pressure sensor, the data from all pressure sensors in each of the multiplicity of the above ground member data tranches are collected
at substantially the same time whereby the data from each set are collected at substantially the same time. The terminology of substantially the same time is defined above. Accordingly, step 412 and step 414 would be directed to a multiplicity of underwater and above water data tranches respectively.

FIGS. 5A-5B illustrate a flowchart 500 method for sensing an entry of an object into a pool in accordance with the present disclosure. Both FIGS. 5A and 5B together make a complete flowchart 500. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 502 includes positioning at least one underwater sensor enclosure beneath a surface of the pool. Step 504 includes positioning at least one above ground sensor enclosure above the surface of the pool. Step 506 includes measuring a summation of water pressure and barometric pressure with the at least one underwater sensor enclosure having at least one pressure sensor. Step 508 includes measuring barometric pressure with the at least one above ground sensor. Step 510 includes receiving, in a processor within a receiver, data from each of the at least one pressure sensors of the underwater sensor enclosure and of the above ground sensor enclosure, respectively. Step 512 includes sequentially collecting pressure sensor data from the at least one pressure sensor of the underwater sensor enclosure and from the at least one pressure sensor of the above ground sensor enclosure. Step 514 includes defining a pair of pressure data tranches within the processor to comprise: an underwater member data tranche having data collected from the at least one pressure sensor of the underwater pressure sensor enclosure, and an above ground member data tranche having data collected from the at least one pressure sensor of the above ground pressure sensor enclosure, whereby the data from each of the members of the pair were collected at substantially the same time. Step 516 includes further configuring the processing unit for: calculating an average underwater pressure from the underwater member data tranche; calculating an average above ground pressure from the above ground member data tranche; calculating a differential pressure by subtracting the average above ground pressure from the average underwater pressure; calculating a first moving average differential pressure to determine the average differential pressure over a time period; calculating a second moving average differential pressure at a time gap before the first moving average is determined; calculating a change in moving average differential pressure by subtracting the second moving average differential pressure from the first moving average differential pressure; and calculating a mass of an entrant object by multiplying a calibration factor by a difference of a current moving average differential pressure with at least one prior moving average differential pressure. Step 518 includes alerting a user of the mass of the entrant object, whereby a positive mass represents water entry and a negative mass represents water exit. The user may be alerted to the mass of the entrant object by the speaker playing a sound audible to the user, where the sound announces or calls out the mass of the entrant object. The user may also be alerted through notification on a smart device or other remote device.

In one example, the sensors may be normalized before use so they provide the same pressure value when measuring the same pressure. In another embodiment, the pressure data can be filtered to remove outliers. For example, a pressure sensor whose removal from the tranche average dramatically reduces the standard deviation of the average may be malfunctioning and could removed from the average. In another embodiment, the pressure readings over an time interval could be filtered to remove periodic noise (for example, from pumps and natural events) using Fourier filtering techniques.

In one example, a log file may be retained in the processor memory. This file retains event data including for entrant/exit mass as well event time. These data may be used to remind the user of an event. The user may confirm or block such reminders. Moreover, the file may contain information regarding calibration date/time and normalization data/time as well as statistics including tranche standard deviations. Such data may be useful in providing error codes and diagnostic information.

In one example, the device may be powered by an external source or battery powered. In another embodiment, the device may be battery powered with recharging capability from solar cells, wind power, or another external source.

Figure 6A:
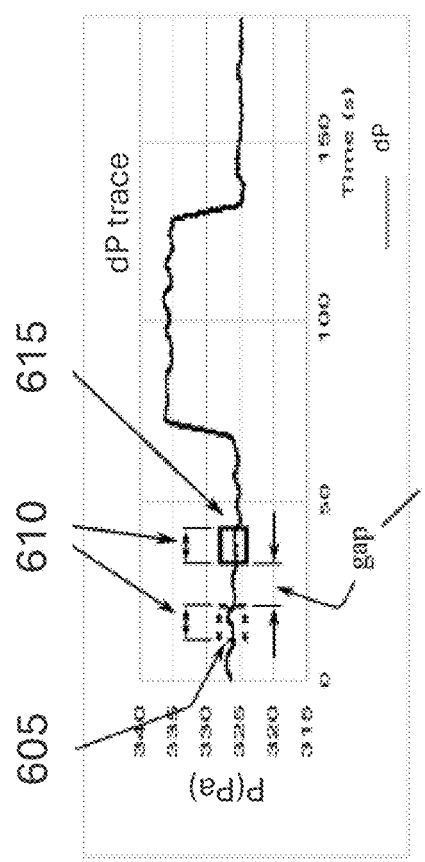
FIGS. 6A-6B illustrate graphs of an exemplary analysis of the change in differential pressure.
Figure 6B:
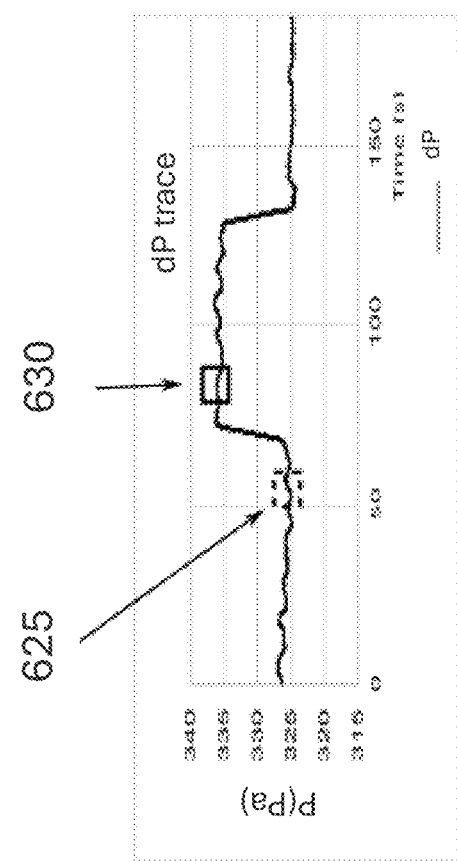

FIGS. 6A-6B illustrate graphs of an exemplary analysis of the change in differential pressure. FIG. 6A is a graph showing a first moving average 615 and a second moving average 605 measured before a body enters a pool 105. FIG. 6B is a graph showing the first moving average 630 and second moving average 625 measured during the time a body enters a pool 105.

In FIG. 6A, the first moving average 615 is measured at time t, which is indicated in seconds across a moving average period 610 of a particular duration. A gap 620 is shown, indicating a time where the second moving average 605 is not measured. The second moving average 605 is measured at a lagging time in front of the first moving average 615 according to the gap time 620. As may be seen in the graph, the differential pressure spikes considerably higher after the two moving average differential pressures have been measured in FIG. 6A around 70 seconds into the measurement period. Calculating the difference between the first and second moving averages 605, 615 will not yield any significant result to indicate an entrant body over the measured time.

In FIG. 6B, the second moving average 625 is measured. A short time later, the differential pressure measures higher.

The first moving average 630 is then measured. Calculating the difference between the first and second moving averages 625, 630 will show that a body has entered the pool 105 during the measurement time.

Figure 7:
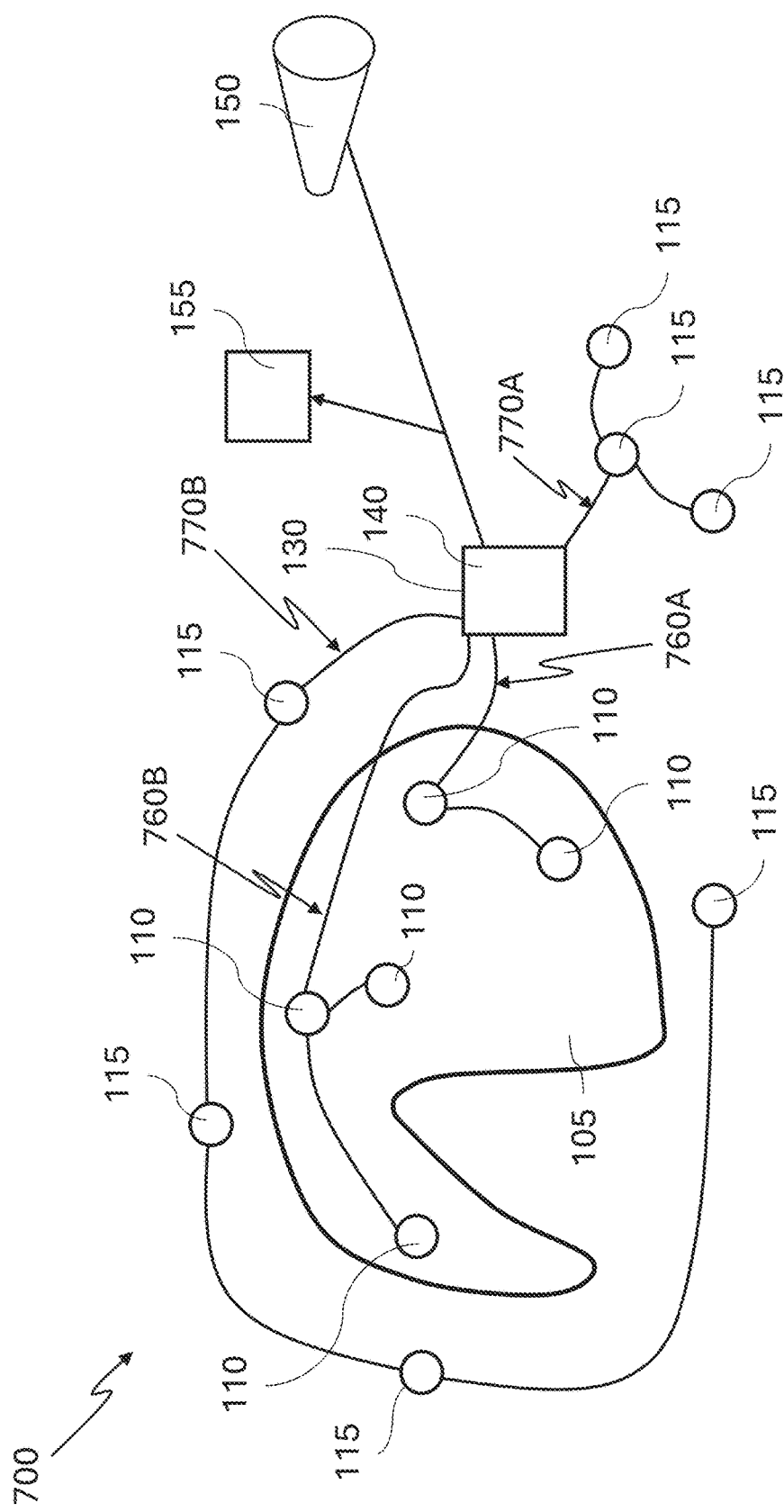
FIG. 7 illustrates a top view of a system for detecting entry of an object into a pool configured for use in a pool in accordance with the present disclosure.

FIG. 7 illustrates a top view of a system 700 for detecting entry of an object into a pool 105 configured for use in a pool 105 in accordance with the present disclosure. FIG. 7 may be understood with reference to FIG. 1, above. Where reference characters are similarly-numbered, these should be understood to denote like components as disclosed herein.

The system 700 may be an exemplary embodiment of the system 100 of FIG. 1 having a plurality of underwater sensor enclosures 110 and above ground sensor enclosures 715. Illustrated is a plurality of both underwater sensor enclosures 710 and a plurality of above ground sensor enclosures 115. Here, each of the plurality of underwater sensor enclosures 110 and plurality of above ground sensor enclosures 115 may be clustered and connected to the receiver 130 in parallel. For example, a first cluster of at least two underwater sensor enclosures 110 may be connected to the receiver 130 to form a first underwater sensor enclosure cluster 760A. The first underwater sensor enclosure cluster 760A may be positioned in a first location within the pool 105, in this example, the shallow end. Then, a second cluster of at least two underwater sensor enclosures 110 may be connected to the receiver 130 to form a second underwater sensor enclosure cluster 760B. The second underwater sensor enclosure cluster 760B may be positioned in a second location within the pool 105 which is a distance away from the first location within the pool 105. In this example, the second location within the pool 105 may be the deep end. Any additional number of underwater sensor clusters may be created as desired by the user. The use of additional underwater sensor clusters or a plurality thereof may increase the sensitivity of the system overall or may aid in better detecting the entry of an object in a pool 705 where the pool 705 is large, very deep, or irregularly shaped.

The underwater sensor enclosures 110 of each of first and second underwater sensor enclosure clusters 760A, 760B are placed closely together to achieve greater data collection and sensitivity within a given area. For example, a cluster of three underwater sensor enclosures 110 may be placed in the deep end, where data is gathered by each underwater sensor enclosure 110 in the manner described relative to FIGS. 2-6B. However, with three underwater sensor enclosures 110, multiple data points from substantially the same area in the pool 105 may be gathered. The three underwater sensor enclosures 110 may be placed substantially close to one another, which can be understood to mean in a region of the pool 105 where the depth is relatively constant or does not drastically change. Data gathered from the underwater sensor enclosure cluster 760A, 760B may be compared to one another to obtain an average pressure value at a given time and then subsequently processed in the aforementioned data processing manner. This data may then be compared against data from another underwater sensor enclosure cluster 760A, 760B, where the comparison may provide further data for the processor 140 within the receiver 130 to account for noise signals or general pressure differences sensed at different depths of the pool 105. In one example, this process can best be described as gathering data from each of the underwater sensor enclosure clusters 760A, 760B, and averaging said data from each underwater sensor enclosure cluster 760A, 760B into one underwater member data tranche 210. In another example, each of the sensor enclosure clusters 760A, 760B may gather data into their own respective underwater member data tranche 210, and may subsequently be processed according to the data processing methods and processes described herein.

Additionally, the presence of multiple underwater sensor enclosures 110 in a cluster 760A, 760B may provide redundancies in the system, where the failure of one underwater sensor enclosure 110 or any other reason which may otherwise interfere with the data gathering and processing of one underwater sensor enclosure 110 may not stall the system. With the presence of multiple underwater sensor enclosures 110, the system may function even in the case of momentary outages of one or more underwater sensor enclosures 110.

The underwater sensor clusters 760A, 760B may be arranged in several ways to improve sensing pressure changes and changes in water conditions. In one example the first underwater sensor enclosure cluster 760A may be positioned a distance away from the second underwater sensor enclosure cluster 760B. For example, a distance away may be understood to mean that each of the underwater sensor enclosure clusters 760A, 760B are positioned on opposite ends of the pool 105. In other examples, at least a portion of the underwater sensor enclosures 110 of the underwater sensor enclosure clusters 760A, 760B may be in the corners of the pool 105 to improve sensitivity in those regions of the pool 105. In another example, irregularly shaped pools 105 (as illustrated in FIG. 7) may benefit from at least a portion of the underwater sensor enclosure 110 of the underwater sensor enclosure cluster 760A, 760B being positioned within the irregularly shaped area, which is an area that may otherwise not be sensed by the remaining plurality of underwater sensor enclosures 110.

Similarly, the above ground sensor enclosures 115 may also be clustered. A first cluster of at least two above ground sensor enclosures 115 may be connected to the receiver 130 to form a first above ground sensor enclosure cluster 770A. The first above ground sensor enclosure cluster 770A may be positioned in a first location above the ground and around the pool 105, in this example, the area above the ground near the shallow end of the pool 105. Then, a second cluster of at least two above ground sensor enclosures 115 may be connected to the receiver 130 to form a second above ground sensor enclosure cluster 770B. The second above ground sensor enclosure cluster 770B may be positioned in a second location above the ground and around the pool 105. In this example the second location may be an area above the ground near the deep end of the pool 105 or around the perimeter of the pool 105. Any additional number of above ground sensor clusters may be created as desired by the user. The use of additional above ground sensor clusters or a plurality thereof may increase the sensitivity of the system overall or may aid in better detecting the entry of an object in a pool 105 where the pool 105 is large, deep, or irregularly shaped.

The above ground sensor enclosures 115 of each of first and second above ground sensor enclosure clusters 770A, 770B are placed closely together to achieve greater data collection and sensitivity within a given area. For example, a cluster of three above ground sensor enclosures 115 may be placed around a perimeter of the pool 105, where data is gathered by each above ground sensor enclosure 115 in the manner described relative to FIGS. 2-6B. However, with three above ground sensor enclosures 115, multiple data points from around the pool, and encircling the area around the pool 105 may be gathered. The three above ground sensor enclosures 115 may each be placed a distance away from one another, which can be understood to mean that they are placed in an area around the pool 105 at a designated distance away from each other, where each of the above around sensor enclosures 115 within the above ground sensor enclosure clusters 770A, 770B being connected to one another in series. Data gathered from the above ground sensor enclosure clusters 770A, 770B may be compared to one another to obtain an average barometric pressure value at a given time and then subsequently processed in the aforementioned data processing manner. This data may then be compared against data from another above ground sensor enclosure cluster 770A, 770B, where the comparison may provide further data for the processor 140 within the receiver 130 to account for noise signals or general pressure differences sensed at different points around the pool 105.

In one example, this process can best be described as gathering data from each of the above ground sensor enclosure clusters 770A, 770B, and averaging said data from each above ground sensor enclosure cluster 770A, 770B into one above ground member data tranche 215. In another example, each of the sensor enclosure clusters 770A, 770B may gather data into their own respective above ground member data tranche 215, and may subsequently be processed according to the data processing methods and processes described herein.

Additionally, the presence of multiple above ground sensor enclosures 115 in a cluster 770A, 770B may provide redundancies in the system, where the failure of one above ground sensor enclosure 115 or any other reason which may otherwise interfere with the data gathering and processing of one above ground sensor enclosure 115 may not stall the system. With the presence of multiple above ground sensor enclosures 115, the system may function even in the case of momentary outages of one or more above ground sensor enclosures 115.

The above ground sensor clusters 770A, 770B may be arranged in several ways to improve sensing barometric pressure changes and changes in air conditions. In one example, the first above ground sensor enclosure cluster 770A may be positioned a distance away from the second above ground sensor enclosure cluster 770B. A distance away may be understood to mean that each of the above ground sensor enclosure clusters 770A, 770B, or a portion thereof, are positioned on opposite ends of the pool 105. In other examples, at least a portion of the underwater sensor enclosures 115 of the above ground sensor enclosure clusters 770A, 770B may be around the perimeter at the corners of the pool 105 to improve sensitivity around those regions of the pool 105. In another example, irregularly shaped pools 105 (as illustrated in FIG. 7) may benefit from at least a portion of the above ground sensor enclosure 115 of the above ground sensor enclosure cluster 770A, 770B being positioned around the irregularly shaped area, which is an area that may otherwise not be accurately sensed by the remaining plurality of above ground sensor enclosures 115.

The arrangement of the underwater sensor enclosure clusters 760A, 760B need not be coordinated with the arrangement of above ground sensor enclosure clusters 770A, 770B. That is, the underwater sensor enclosure clusters 760A, 760B need not be in line or proximal to its respective above ground sensor enclosure clusters 770A, 770B. In some cases, however, this proximal arrangement of each sensor enclosure cluster 760A, 760B, 770A, 770B may be desired, as it may provide an additional data processing step, where data collected from each of the first underwater and above ground sensor enclosure clusters 760A, 770A may be processed as described relative to FIGS. 2-6B and the data collected from each of the second underwater and above ground sensor enclosure clusters 760B, 770B may be processed as described relative to FIGS. 2-6B independently from the first sensor enclosure clusters 760A, 770A. This, in essence, may function as having two independent sensor systems for sensing pressure changes within the pool 105.

It should be noted that there are several electrical configurations which may be utilized for arranging the sensor enclosures 110, 115 and the sensor enclosure clusters 760A, 760B, 770A, 770B. In one such example, each of the plurality of underwater sensor enclosures 110 of each underwater sensor enclosure cluster 760A, 760B may be electrically connected in parallel to one another and the underwater sensor enclosure clusters 760A, 760B themselves are electrically connected in parallel to the receiver 130. Similarly, each of the plurality of above ground sensor enclosures 115 of each underwater sensor enclosure clusters 770A, 770B may be electrically connected in parallel to one another and the underwater sensor enclosure clusters 770A, 770B themselves are electrically connected in parallel to the receiver 130. FIG. 7 contains many of the same features, structures, and functions as described relative to FIG. 1, which are not restated for FIG. 7 for brevity in disclosure.

Figure 8:
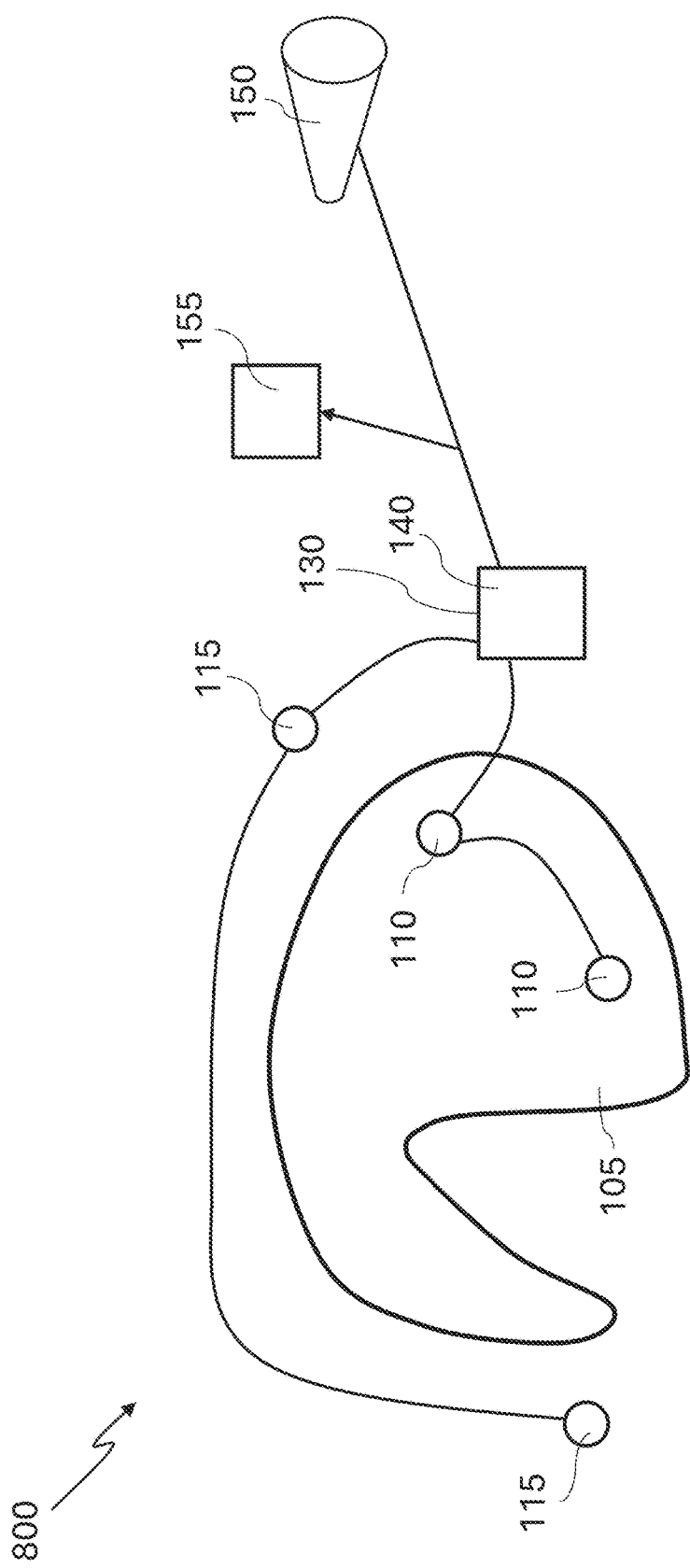
FIG. 8 illustrates a top view of a system for detecting entry of an object into a pool configured for use in a pool in accordance with the present disclosure.

FIG. 8 illustrates a top view of a system 800 for detecting entry of an object into a pool 105 configured for use in a pool 105 in accordance with the present disclosure. FIG. 8 may be understood with reference to FIGS. 1 and 7, above. Where reference characters are similarly-numbered, these should be understood to denote like components as disclosed herein.

The system 800 may be an exemplary embodiment of the system 100 of FIG. 1 having a plurality of underwater sensor enclosures 110 and above ground sensor enclosures 115. In this example, two underwater sensor enclosures 110 electrically connected in series may be placed underwater in the pool 105 a distance away from each other. Two above ground sensor enclosures 115 electrically connected in series may be electrically connected in series and placed above the ground around the perimeter of the pool 105. The pair of underwater sensor enclosures 110 and the pair of above around sensor enclosures 115 may be sufficient for accurate measurements of changes in water pressure as a result of an object falling into the pool 105, where the pool 105 is larger than average or otherwise irregular in shape. Measurements may also be more accurate in all types of pools, and may be made more accurate with proper positioning of the pair of underwater sensor enclosures 110 relative to each other and at a distance and the positioning of the pair of above ground sensor enclosures 115 relative to each other and at a distance Data gathered from the pair of the underwater sensor enclosures 110 may be compared against each other, where data gathered from a first of the two underwater sensor enclosure 110 is compared to or averaged with the data gathered from a second of the two underwater sensor enclosures 110. This yields an average pressure value, which is then processed in accordance with the data processing steps and processes as described herein relative to FIGS. 2-6B.

The pair of underwater sensor enclosures 110 may be positioned a distance away from each other in the same manner that the clusters 760A, 760B, 770A, 770B of FIG. 7 were positioned a distance away. In one example, one of the two underwater sensor enclosures 110 may be positioned in a shallow end of the pool 105, and the second of the two underwater sensor enclosures 110 may be positioned in the deep end of the pool 105. This configuration of the underwater sensor enclosures 110 may improve the sensing capabilities of the underwater sensor enclosures 110, as changes in pressure conditions may be sensed across the entire volume of the pool 105. Similarly, at least one of the two underwater sensor enclosures 110 may be positioned where persons are most likely to enter the pool 105 or possibly fall into the pool 105. Similarly, one underwater sensor enclosure 110 may be placed near a jet, drain, or any other pool 105 component that causes turbulent water conditions, and the other underwater sensor enclosure 110 placed in an area with relatively more stagnant conditions. This configuration may help for the underwater sensor enclosures 110 and thus the processor 140 to account for general changes in water conditions due to events and conditions other than the entry of an object into the pool 105. In another example, one of the pairs of underwater sensor enclosures 110 may be positioned in a far area, or an irregularly shaped outlet of the pool 105 which would otherwise not be sensed by a single underwater sensor enclosure 110. In this example, the benefit of the pair of underwater sensor enclosures is simply to provide greater volume coverage for sensing pressure changes, as well as accounting for irregularly shaped pools 105, as is depicted in FIG. 8 where the pool 105 may be said to have two parts.

Similarly, the positioning of the pair of above around sensor enclosures 115 may also be positioned a distance away from each other in the same manner that the clusters 760A, 760B, 770A, 770B of FIG. 7 were positioned a distance away. This configuration of above ground sensor enclosures 115 may have the benefit of accounting for smaller changes in barometric pressure. Particularly, this may be useful in periods of strong wind gust, where a high change in barometric pressure may be detected by one of the above around sensor enclosures 115 of the pair before the other. In this case, additional configuration of the processor and data processing methods may be preferred in order for the system to account for such environmental changes.

It should be noted that any combination, electrical, and positional configurations of underwater sensor enclosures 110 and above around sensor enclosures 115 may be used to achieve greater accuracy and reliable measurements of persons or objects falling into the pool 105. This means that the sensor enclosures 110, 115 may be electrically connected to the same respectively in series or parallel. In other words, the underwater sensor enclosure 110 may be connected to another underwater sensor enclosure 110, etc., in either series or parallel and/or the above ground sensor enclosure 115 may be connected to another above ground sensor enclosure 115, etc., in either series of parallel, where each of the underwater sensor enclosure 110 and above ground sensor enclosure 115 connect to the receiver 140. Additionally, each of the underwater sensor enclosures 110 and the above ground sensor enclosures 115 may be positioned, respectively at any location under the water, or above the ground around the pool 105. FIG. 8 contains many of the same features, structures, and functions as described relative to FIG. 1, which are not restated for FIG. 8 for brevity in disclosure.

FIGS. 9A-9C illustrate a flowchart 900 method for sensing an entry of an object into a pool in accordance with the present disclosure. All of FIGS. 9A, 9B, and 9C together make a complete flowchart 900. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 902 includes providing at least one underwater sensor enclosure having at least one pressure sensor, the underwater sensor enclosures positionable beneath a surface of the pool, wherein the at least one pressure sensor of the at least one underwater sensor enclosure measures a summation of water pressure and barometric pressure.

Step 904 includes providing at least one above ground sensor enclosure having at least one pressure sensor, the above ground sensor enclosure positionable above the surface of the pool, wherein the at least one pressure sensor of the at least one above ground sensor enclosure measures barometric pressure.

Step 906 includes providing a receiver having a processing unit, the receiver communicably connected to each of the at least one pressure sensors of the at least one underwater sensor enclosure and of the at least one above ground sensor enclosure, respectively, wherein the receiver collects pressure sensor data from the at least one pressure sensor of the at least one underwater sensor enclosure and from the at least one pressure sensor of the at least one above ground sensor enclosure.

Step 908 includes positioning the at least one underwater sensor enclosure beneath a surface of the pool.

Step 910 includes positioning the at least one above ground sensor enclosure above the surface of the pool.

Step 912 includes measuring a summation of water pressure and barometric pressure with the pressure sensor of the at least one underwater sensor enclosure, wherein the pressure data from the pressure sensors within each enclosure is collected at substantially the same time.

Step 914 includes measuring barometric pressure with the pressure sensor of the at least one above ground sensor enclosure.

Step 916 includes receiving, in a processing unit within the receiver, data from each of the at least one pressure sensors of the at least one underwater sensor enclosure and of the at least one above ground sensor enclosure, respectively.

Step 918 includes collecting pressure sensor data from the at least one pressure sensor of the at least one underwater sensor enclosure and from the at least one pressure sensor of the at least one above ground sensor enclosure.

Step 920 includes defining a set of pressure data tranches in the processing unit to comprise: the underwater member data tranches having data collected from the at least one pressure sensors of the at least one underwater pressure sensor enclosure, and an above ground member data tranche having data collected from the at least one pressure sensor of the at least one above ground pressure sensor enclosures, whereby the data from the underwater member data tranches and above water data tranches were collected at substantially the same time.

Step 922 includes wherein the processing unit performs a data processing method having the steps of: calculating an average underwater pressure from the underwater member data tranches; calculating an average above ground pressure from the above ground member data tranches of the set; calculating a differential pressure by subtracting the average above ground pressure from the average underwater pressure of the set; calculating a first moving average differential pressure to determine the average differential pressure over a time period; calculating a second moving average differential pressure at a time gap before the first moving average is determined; calculating a change in moving average differential pressure by subtracting the second moving average differential pressure from the first moving average differential pressure; calculating a mass of an entrant object by multiplying a calibration factor by the change in moving average differential pressure; and alerting a user of the mass of the entrant object, whereby a positive mass represents water entry and a negative mass represents water exit.

The following examples may be understood with reference to FIGS. 1-9C, above.

One example includes a system for detecting the entry of an object into a pool, comprising:
  an underwater sensor enclosure having at least one pressure sensor, the underwater sensor enclosure positionable beneath a surface of the pool, wherein the at least one pressure sensor of the underwater sensor enclosure measures a summation of water pressure and barometric pressure;
  an above ground sensor enclosure having at least one pressure sensor, the above ground sensor enclosure positionable above the surface of the pool, wherein the at least one pressure sensor of the above ground sensor enclosure measures barometric pressure; and
  a receiver having a processing unit, the receiver communicably connected to each of the at least one pressure sensors of the underwater sensor enclosure and of the above ground sensor enclosure, respectively, wherein the receiver sequentially collects pressure sensor data from the at least one pressure sensor of the underwater sensor enclosure and from the at least one pressure sensor of the above ground sensor enclosure; and
  wherein the processing unit processes sequential pairs of pressure data tranches, wherein each pair of pressure data tranches comprises: an underwater member data tranche having data collected from the at least one pressure sensor of the underwater pressure sensor enclosure, and an above ground member data tranche having data collected from the at least one pressure sensor of the above ground pressure sensor enclosure;
  wherein the processing unit is configured to:
    store the pairs of pressure data tranches;
    calculate an average underwater pressure from the underwater member data tranche;
    calculate an average above ground pressure from the above ground member data tranche;
    calculate a differential pressure by subtracting the average above ground pressure from the average underwater pressure;
    calculate a first moving average pressure to determine the average differential pressure over a time period;
    calculate a second moving average pressure at a time gap before the first moving average pressure is determined;
    calculate the change in moving average pressure by subtracting the second moving average pressure from the first moving average pressure; and
    calculate a mass of an entrant object by multiplying a calibration factor with the change in moving average pressure,
    wherein the pressure sensor of the underwater sensor enclosure may be electrically connected to the receiver,
  wherein the pressure sensor of the above ground sensor enclosure may be wirelessly connected to the receiver,
    wherein the system may include a speaker communicably connected to the receiver,
    wherein the speaker may announce a weight of the entrant object.
    wherein the receiver may be configured to wirelessly connect to a smart device.

Another example method for detecting an entry of an object into a pool, comprising the following steps: providing at least one underwater sensor enclosure having at least one pressure sensor, the underwater sensor enclosures positionable beneath a surface of the pool, wherein the at least one pressure sensor of the at least one underwater sensor enclosure measures a summation of water pressure and barometric pressure;

providing at least one above ground sensor enclosure having at least one pressure sensor, the above ground sensor enclosure positionable above the surface of the pool, wherein the at least one pressure sensor of the at least one above ground sensor enclosure measures barometric pressure;

providing a receiver having a processing unit, the receiver communicably connected to each of the at least one pressure sensors of the at least one underwater sensor enclosure and of the at least one above ground sensor enclosure, respectively, wherein the receiver collects pressure sensor data from the at least one pressure sensor of the at least one underwater sensor enclosure and from the at least one pressure sensor of the at least one above ground sensor enclosure;

positioning the at least one underwater sensor enclosure beneath a surface of the pool;

positioning the at least one above ground sensor enclosure above the surface of the pool;

measuring a summation of water pressure and barometric pressure with the pressure sensor of the at least one underwater sensor enclosure, wherein the pressure data from the pressure sensors within each enclosure is collected at substantially the same time;

measuring barometric pressure with the pressure sensor of the at least one above ground sensor enclosure;

receiving, in a processing unit within the receiver, data from each of the at least one pressure sensors of the at least one underwater sensor enclosure and of the at least one above ground sensor enclosure, respectively;

collecting pressure sensor data from the at least one pressure sensor of the at least one underwater sensor enclosure and from the at least one pressure sensor of the at least one above ground sensor enclosure;

defining a set of pressure data tranches in the processing unit to comprise: the underwater member data tranches having data collected from the at least one pressure sensors of the at least one underwater pressure sensor enclosure, and an above ground member data tranche having data collected from the at least one pressure sensor of the at least one above ground pressure sensor enclosures, whereby the data from the underwater member data tranches and above water data tranches were collected at substantially the same time, wherein the processing unit performs a data processing method having the steps of:

calculating an average underwater pressure from the underwater member data tranches of the set;

calculating an average above ground pressure from the above ground member data tranches of the set;

calculating a differential pressure by subtracting the average above ground pressure from the average underwater pressure;

calculating a first moving average differential pressure to determine the average differential pressure over a time period;

calculating a second moving average differential pressure at a time gap before the first moving average is determined;

calculating a change in moving average differential pressure by subtracting the second moving average differential pressure from the first moving average differential pressure;

calculating a mass of an entrant object by multiplying a calibration factor by the change in moving average differential pressure; and alerting a user of the mass of the entrant object, whereby a positive mass represents water entry and a negative mass represents water exit.

Another example includes a method for detecting an entry of an object into a pool, comprising the following steps:

measuring a summation of water pressure and barometric pressure with at least one underwater sensor positionable beneath a surface of the pool;

measuring barometric pressure with at least one above ground sensor positionable above the surface of the pool;

receiving, in a receiver, data from each of the at least one underwater sensors and of the above ground sensors, respectively;

collecting pressure sensor data from the at least one underwater sensor and from the at least one above ground sensor;

defining a pair of pressure data tranches to comprise: an underwater member data tranche having data collected from the at least one pressure sensor of the underwater pressure sensor enclosure, and an above ground member data tranche having data collected from the at least one pressure sensor of the above ground pressure sensor enclosure whereby the data from each of the members of the pair were collected at substantially the same time;

calculating an average underwater pressure from the underwater member data tranche;

calculating an average above ground pressure from the above ground member data tranche;

calculating a differential pressure by subtracting the average above ground pressure from the average underwater pressure;

calculating a moving average pressure to determine the average differential pressure over a time period;

calculating a mass of an entrant object by multiplying a calibration factor by a difference of a current moving average pressure with at least one prior moving average pressure; and alerting a user of the mass of the entrant object, whereby a positive mass represents water entry and a negative mass represents water exit, wherein the method also has steps of calibrating each of the at least one underwater sensors and the at least one above ground sensors, wherein the user may be alerted to the mass of the entrant object on a smart device, wherein the user may be alerted to the mass of the entrant object by a speaker announcing the mass of the entrant object.

Another example includes a method for detecting an entry of an object into a pool, comprising the following steps:

positioning at least one underwater sensor enclosure beneath a surface of the pool;

positioning at least one above ground sensor enclosure above the surface of the pool;

measuring a summation of water pressure and barometric pressure with the at least one underwater sensor enclosure having at least one pressure sensor;

measuring barometric pressure with the at least one above ground sensor;

receiving, in a processing unit within a receiver, data from each of the at least one pressure sensors of the underwater sensor enclosure and of the above ground sensor enclosure, respectively;

sequentially collecting pressure sensor data from the at least one pressure sensor of the underwater sensor enclosure and from the at least one pressure sensor of the above ground sensor enclosure;

defining a pair of pressure data tranches in the processing unit to comprise: an underwater member data tranche having data collected from the at least one pressure sensor of the underwater pressure sensor enclosure, and an above ground member data tranche having data collected from the at least one pressure sensor of the above ground pressure sensor enclosure, whereby the data from each of the members of the pair were collected at substantially the same time, wherein the processing unit performs a method comprising the steps of:

calculating an average underwater pressure from the underwater member data tranche;

calculating an average above ground pressure from the above ground member data tranche;

calculating a differential pressure by subtracting the average above ground pressure from the average underwater pressure;

calculating a first moving average differential pressure to determine the average differential pressure over a time period;

calculating a second moving average differential pressure at a time gap before the first moving average is determined;

calculating a change in moving average differential pressure by subtracting the second moving average differential pressure from the first moving average differential pressure;

calculating a mass of an entrant object by multiplying a calibration factor by a difference of a current moving average differential pressure with at least one prior moving average differential pressure; and alerting a user of the mass of the entrant object, whereby a positive mass represents water entry and a negative mass represents water exit, wherein it may include the steps of calibrating each of the at least one underwater sensor and the at least one above ground sensor, wherein the user may be alerted of the mass of the entrant object on a smart device wherein the user may be alerted to the mass of the entrant object by a speaker announcing the mass of the entrant object.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

REFERENCE NUMERALS 100 system for detecting entry of an object into a pool
105 pool
110 underwater sensor enclosure
110a pressure sensor(s)
110b connection port
115 above ground sensor enclosure
115a pressure sensor(s)
130 receiver
140 processing unit
150 speaker(s)
155 remote device(s)
200 pressure data
210 pressure data tranches from underwater sensor enclosure
215 pressure data tranches from above ground sensor enclosure
300 pressure readings
310 exemplary data collected from underwater sensor enclosure
315 exemplary data collected from above ground sensor enclosure
320 differential pressure between above water and below water pressure
400 Flow chart
402 step 402
404 step 404
406 step 406
408 step 408
410 step 410
412 step 412
414 step 414
416 step 416
418 step 418
420 step 420
422 step 422
500 flow chart
502 step 502
504 step 504
506 step 506
508 step 508
510 step 510
512 step 512
514 step 514
516 step 516
518 step 518
605 second moving average
610 moving average period
615 first moving average
620 gap time
625 second moving average
630 first moving average
700 system for detecting entry of an object into a pool
760A first underwater sensor enclosure cluster
760B second underwater sensor enclosure cluster
770A first above ground sensor enclosure cluster
770B second above ground sensor enclosure cluster
800 system for detecting entry of an object into a pool
900 flow chart
902 step 902
904 step 904
906 step 906
908 step 908
910 step 910
912 step 912
914 step 914
916 step 916
918 step 918
920 step 920
922 step 922

What is claimed is:

1. A method for detecting an entry of an object into a pool, comprising the following steps:
provproviding at least one underwater sensor enclosure having at least one pressure sensor, the underwater sensor enclosures positionable beneath a surface of the pool, wherein the at least one pressure sensor of the at least one underwater sensor enclosure measures a summation of water pressure and barometric pressure;
providing at least one above ground sensor enclosure having at least one pressure sensor, the above ground sensor enclosure positionable above the surface of the pool, wherein the at least one pressure sensor of the at least one above ground sensor enclosure measures barometric pressure;
providing a receiver having a processing unit, the receiver communicably connected to each of the at least one pressure sensors of the at least one underwater sensor enclosure and of the at least one above ground sensor enclosure, respectively, wherein the receiver collects pressure sensor data from the at least one pressure sensor of the at least one underwater sensor enclosure and from the at least one pressure sensor of the at least one above ground sensor enclosure;
positioning the at least one underwater sensor enclosure beneath a surface of the pool;
positioning the at least one above ground sensor enclosure above the surface of the pool;
measuring a summation of water pressure and barometric pressure with the pressure sensor of the at least one underwater sensor enclosure, wherein the pressure data from the pressure sensors within each enclosure is collected contemporaneously within less than 8 seconds;
measuring barometric pressure with the pressure sensor of the at least one above ground sensor enclosure;
receiving, in a processing unit within the receiver, data from each of the at least one pressure sensors of the at least one underwater sensor enclosure and of the at least one above ground sensor enclosure, respectively;
collecting pressure sensor data from the at least one pressure sensor of the at least one underwater sensor enclosure and from the at least one pressure sensor of the at least one above ground sensor enclosure;
defining a set of pressure data tranches in the processing unit to comprise: the underwater member data tranches having data collected from the at least one pressure sensors of the at least one underwater pressure sensor enclosure, and an above ground member data tranche having data collected from the at least one pressure sensor of the at least one above ground pressure sensor enclosures, whereby the data from the underwater member data tranches and above water data tranches were collected contemporaneously within less than 16 seconds,
wherein the processing unit performs a data processing method having the steps of:
calculating an average underwater pressure from the underwater member data tranches of the set;
calculating an average above ground pressure from the above ground member data tranches of the set;
calculating a differential pressure by subtracting the average above ground pressure from the average underwater pressure;
calculating a first moving average differential pressure to determine the average differential pressure over a time period;
calculating a second moving average differential pressure at a time gap before the first moving average is determined;
calculating a change in moving average differential pressure by subtracting the second moving average differential pressure from the first moving average differential pressure;
calculating a mass of an entrant object by multiplying a calibration factor by the change in moving average differential pressure; and
alerting a user of the mass of the entrant object, whereby a positive mass represents water entry and a negative mass represents water exit.

2. The method of claim 1, wherein a plurality of pressure sensors is positioned within the underwater sensor enclosure and a plurality of pressure sensors is positioned within the above ground sensor enclosure, wherein the underwater member data tranche comprises pressure sensor data collected within less than 1 second from the pressure sensors of the underwater sensor enclosure and the above ground member data tranche comprises pressure sensor data collected within less than 1 second from the pressure sensors of the above ground sensor enclosure, and wherein the data from the set of pressure data tranches are collected within less than 2 seconds.

3. The method of claim 1, further comprising the step of connecting the pressure sensor of the above ground sensor enclosure wirelessly to the receiver.

4. The method of claim 1, further comprising the step of connecting a speaker to the receiver, wherein the speaker provides an audible alert.

5. The method of claim 1, whereby alerting a user of the mass of the entrant object is done by a notification on a smart device.

6. A method for detecting an entry of an object into a pool, comprising the following steps:
measuring a summation of water pressure and barometric pressure with at least one underwater sensor positionable beneath a surface of the pool;
measuring barometric pressure with at least one above ground sensor positionable above the surface of the pool;
receiving, in a receiver, data from each of the at least one underwater sensors and of the above ground sensors, respectively;
collecting pressure sensor data from the at least one underwater sensor and from the at least one above ground sensor;
defining a pair of pressure data tranches to comprise: an underwater member data tranche having data collected from the at least one pressure sensor of the underwater pressure sensor enclosure, and an above ground member data tranche having data collected from the at least one pressure sensor of the above ground pressure sensor enclosure whereby the data from each of the members of the pair were collected contemporaneously within less than 8 seconds;
calculating an average underwater pressure from the underwater member data tranche;
calculating an average above ground pressure from the above ground member data tranche;
calculating a differential pressure by subtracting the average above ground pressure from the average underwater pressure;
calculating a moving average pressure to determine the average differential pressure over a time period;

calculating a mass of an entrant object by multiplying a calibration factor by a difference of a current moving average pressure with at least one prior moving average pressure; and alerting a user of the mass of the entrant object, whereby a positive mass represents water entry and a negative mass represents water exit.

7. The method for detecting the entry of an object into a pool of claim 6, further comprising the step of calibrating each of the at least one underwater sensor and the at least one above ground sensor.

8. The method for detecting the entry of an object into a pool of claim 6, wherein the user is alerted to the mass of the entrant object on a smart device.

9. The method for detecting entry of an object into a pool of claim 6, whereby the user is alerted to the mass of the entrant object by a speaker announcing the mass of the entrant object.

10. A method for detecting an entry of an object into a pool, comprising the following steps:
    positioning at least one underwater sensor enclosure beneath a surface of the pool;
    positioning at least one above ground sensor enclosure above the surface of the pool;
    measuring a summation of water pressure and barometric pressure with the at least one underwater sensor enclosure having at least one pressure sensor;
    measuring barometric pressure with the at least one above ground sensor;
    receiving, in a processing unit within a receiver, data from each of the at least one pressure sensors of the underwater sensor enclosure and of the above ground sensor enclosure, respectively;
    sequentially collecting pressure sensor data from the at least one pressure sensor of the underwater sensor enclosure and from the at least one pressure sensor of the above ground sensor enclosure;
    defining a pair of pressure data tranches in the processing unit to comprise: an underwater member data tranche having data collected from the at least one pressure sensor of the underwater pressure sensor enclosure, and an above ground member data tranche having data collected from the at least one pressure sensor of the above ground pressure sensor enclosure, whereby the data from each of the members of the pair were collected contemporaneously within less than 8 seconds, wherein the processing unit is further configured for:
calculating an average underwater pressure from the underwater member data tranche;
calculating an average above ground pressure from the above ground member data tranche;
calculating a differential pressure by subtracting the average above ground pressure from the average underwater pressure;
calculating a first moving average differential pressure to determine the average differential pressure over a time period;
calculating a second moving average differential pressure at a time gap before the first moving average is determined;
calculating a change in moving average differential pressure by subtracting the second moving average differential pressure from the first moving average differential pressure;
calculating a mass of an entrant object by multiplying a calibration factor by a difference of a current moving average differential pressure with at least one prior moving average differential pressure; and
alerting a user of the mass of the entrant object, whereby a positive mass represents water entry and a negative mass represents water exit.

11. The method for detecting the entry of an object into a pool of claim 10, further comprising the steps of calibrating each of the at least one underwater sensor and the at least one above ground sensor.

12. The method for detecting the entry of an object into a pool of claim 10, whereby the user is alerted of the mass of the entrant object on a smart device.

13. The method for detecting entry of an object into a pool of claim 10, whereby the user is alerted to the mass of the entrant object by a speaker announcing the mass of the entrant object.

* * * * *